US011722534B2

(12) United States Patent
Karampatsis et al.

(10) Patent No.: US 11,722,534 B2
(45) Date of Patent: Aug. 8, 2023

(54) SELECTING A NETWORK CONNECTION BASED ON A MEDIA TYPE

(71) Applicant: Lenovo (Singapore) Pte. Ltd., New Tech Park (SG)

(72) Inventors: Dimitrios Karampatsis, Ruislip (GB); Roozbeh Atarius, La Jolla, CA (US); Andreas Kunz, Ladenburg (DE); Apostolis Salkintzis, Athens (GR); Genadi Velev, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/045,329

(22) PCT Filed: Apr. 4, 2018

(86) PCT No.: PCT/EP2018/058648
§ 371 (c)(1),
(2) Date: Oct. 5, 2020

(87) PCT Pub. No.: WO2019/192692
PCT Pub. Date: Oct. 10, 2019

(65) Prior Publication Data
US 2021/0152615 A1 May 20, 2021

(51) Int. Cl.
*H04L 65/1016* (2022.01)
*H04W 80/10* (2009.01)
(Continued)

(52) U.S. Cl.
CPC ......... *H04L 65/1069* (2013.01); *H04W 80/10* (2013.01)

(58) Field of Classification Search
CPC ............. H04L 65/1069; H04L 65/1073; H04L 65/1006; H04L 65/1016; H04W 40/22; H04W 80/10; H04W 48/18
See application file for complete search history.

(56) References Cited

U.S. PATENT DOCUMENTS 11,159,937 B2 * 10/2021 Bernardos ............. H04W 48/18
2017/0245316 A1 * 8/2017 Salkintzis ............. H04W 48/18
(Continued)

FOREIGN PATENT DOCUMENTS

EP        3873039 A1 *  9/2021  ............. H04L 12/56
WO   WO-2019184987 A1 * 10/2019

OTHER PUBLICATIONS

Motorola Mobility, Lenovo, "Evaluating solutions 8 & 11 against the Key Issue 3 use cases", SA WG2 Meeting #S2-127BIS S2-185144, May 28-Jun. 1, 2018, pp. 1-4.
(Continued)

*Primary Examiner* — Shirley X Zhang
(74) *Attorney, Agent, or Firm* — Kunzler Bean & Adamson

(57) ABSTRACT

Apparatuses, methods, and systems are disclosed for selecting a network slice type for media traffic of an IMS session. One apparatus includes a processor and a transceiver that communicates with a mobile communication network ("MCN") using multiple network connections. The processor receives a first request to establish an IMS session with an IMS network, the first request including multiple media types. Here, the IMS network is reachable via the multiple network connections, each network connection communicating with a different network slice type of the MCN. The processor selects a network connection to be used for communicating media traffic for each media type and transmits a IMS session request to the IMS network using a first network connection. Here, the IMS session request indicates parameters to be used for communicating the media traffic for each media type using the selected network connection.

18 Claims, 20 Drawing Sheets

(51) Int. Cl.
   *H04W 48/18* (2009.01)
   *H04L 65/1069* (2022.01)

(56) References Cited

U.S. PATENT DOCUMENTS

| | | | |
|---|---|---|---|
| 2017/0367036 A1* | 12/2017 | Chen | H04W 48/16 |
| 2019/0124508 A1* | 4/2019 | Watfa | H04L 63/0876 |
| 2019/0274178 A1* | 9/2019 | Salkintzis | H04W 12/03 |
| 2019/0342937 A1* | 11/2019 | Salkintzis | H04W 48/18 |
| 2019/0357130 A1* | 11/2019 | Garcia Azorero | H04W 8/08 |
| 2020/0092790 A1* | 3/2020 | Salkintzis | H04W 40/00 |
| 2020/0280562 A1* | 9/2020 | Salkintzis | H04L 67/306 |

OTHER PUBLICATIONS

3GPP, "3rd Generation Partnership Project; Technical Specification Group Services and System Aspects; IP Multimedia Subsystem (IMS); Stage 2 (Release 15)", 3GPP TS 23.228 V15.2.0, Mar. 2018, pp. 1-330.

PCT/EP2018/058648, "International Search Report", PCT, dated Jul. 4, 2018, pp. 1-4.

Huawei et al., "Network Slice instance selection", SA WG2 Meeting #122 S2-175296, Jun. 26-30, 2017, pp. 1-26.

NTT Docomo, "Network slicing—service/traffic dependent selection", 3GPP TSG-SA WG1 Meeting #71 S1-152156, Aug. 17-21, 2015, pp. 1-3.

Nokia et al., "On Default S-NSSAIs and DNNs", SA WG2 Meeting #122bis S2-176568, Aug. 21-25, pp. 1-4.

Huawei, Hisilicon, "Solution for Network Slicing and IMS Scenario 2", SA WG2 Meeting #126 S2-182176, Feb. 26-Mar. 2, 2018, pp. 1-4.

Motorola Mobility, Lenovo, "Update of solution 11", SA WG2 Meeting #127-bis S2-185146, May 28-Jun. 1, 2018, pp. 1-8.

Motorola Mobility et al., "Update to solution 8—Routing media traffic via different 5G network slices", SA WG2 Meeting #127 S2-1844457, Apr. 16-Apr. 20, 2018, pp. 1-12.

PCT/EP2018/058648, "Written Opinion of the International Searching Authority", PCT, dated Jul. 4, 2018, pp. 1-8.

* cited by examiner

```
INVITE tel:+1-212-555-2222 SIP/2.0
Via: SIP/2.0/UDP [IP address of PDU session used for IMS signaling via    ← 805
         5G network slice 1]]:1357;comp=sigcomp;branch=z9hG4bKnashds7
Max-Forwards: 70
Route: <sip:pcscf1.visited1.net:7531;lr;comp=sigcomp>, <sip:scscf1.home1.net;lr>
P-Preferred-Identity: "John Doe" <sip:user1_public1@home1.net>
P-Access-Network-Info: 3GPP-UTRAN-TDD; utran-cell-id-3gpp=234151D0FCE11
Privacy: none
From: <sip:user1_public1@home1.net>;tag=171828
To: <tel:+1-212-555-2222>
Call-ID: cb03a0s09a2sdfglkj490333
Cseq: 127 INVITE
Require: precondition, sec-agree
Proxy-Require: sec-agree
Supported: 100rel
Security-Verify: ipsec-3gpp; q=0.1; alg=hmac-sha-1-96; spi-c=98765432; spi-s=87654321;
         port-c=8642; port-s=7531
Contact: <sip:[IP address of PDU session used for IMS signaling via 5G network
         slice 1]:1357;comp=sigcomp>                                        805
Allow: INVITE, ACK, CANCEL, BYE, PRACK, UPDATE, REFER, MESSAGE
Content-Type: application/sdp
Content-Length: (...)
v=0
o=- 2987933615 2987933615 IN IP6 5555::aaa:bbb:ccc:ddd
s=-
c=IN IP6 IP address of PDU session used for for media
t=0 0                                              810
m=video 3400 RTP/AVP 98 99
b=AS:75
a=curr:qos local none
a=curr:qos remote none
a=des:qos mandatory local sendrecv
a=des:qos none remote sendrecv
a=rtpmap:98 H263
a=fmtp:98 profile-level-id=0
a=rtpmap:99 MP4V-ES
m=audio 3456 RTP/AVP 97 96
b=AS:25.4
a=curr:qos local none
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone-event
a=maxptime:20
```

SDP Offer 815

FIG. 8

SELECTING A NETWORK CONNECTION BASED ON A MEDIA TYPE

FIELD

The subject matter disclosed herein relates generally to wireless communications and more particularly relates to selecting a network slice type for media traffic of an IMS session.

BACKGROUND

The following abbreviations and acronyms are herewith defined, at least some of which are referred to within the following description.

Third Generation Partnership Project ("3GPP"), Access and Mobility Management Function ("AMF"), Access Point Name ("APN"), Access Stratum ("AS"), Carrier Aggregation ("CA"), Clear Channel Assessment ("CCA"), Control Channel Element ("CCE"), Channel State Information ("CSI"), Call Session Control Function ("CSCF"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet Protocol Multimedia Subsystem ("IMS"), IMS Application Reference Identifier ("IARI"), IMS Communication Service Identifier ("ICSI"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Network Slice Selection Function ("NSSF"), Network Slice Selection Policy ("NSSP"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Quality of Service ("QoS"), Quadrature Phase Shift Keying ("QPSK"), Radio Access Network ("RAN"), Radio Access Technology ("RAT"), Radio Resource Control ("RRC"), Receive ("RX"), Switching/Splitting Function ("SSF"), Scheduling Request ("SR"), Serving Gateway ("SGW"), Session Management Function ("SMF"), System Information Block ("SIB"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Data Repository ("UDR"), User Entity/Equipment (Mobile Terminal) ("UE"), Uniform Resource Name ("URN"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

In wireless communication systems, the core network may be divided into multiple slices to better offer services to users or devices. An IMS domain offers different services to the end user. However, some IMS services may be better suited to one network slice type than to other network slice types.

BRIEF SUMMARY

Methods, apparatuses, and systems for selecting a network slice type for media traffic of an IMS session are disclosed. One apparatus (e.g., a UE) for selecting a network slice type for media traffic of an IMS session includes a transceiver that communicates with a mobile communication network using a plurality of network connections. Here, each network connection communicates via a different network slice type of the mobile communication network. The apparatus includes a processor that receives a first request to establish an IMS session with an IMS network. Here, the IMS network is reachable via the plurality of network connections. Additionally, the first request includes a plurality of media types. The processor selects a network connection to be used for communicating media traffic for each media type of the plurality of media types. The processor also transmits, using a first of the network connections, an IMS session request message to the IMS network. Here, the IMS session request message indicates one or more parameters to be used for communicating the media traffic for each media type over the selected network connection for that media type.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a block diagram illustrating one embodiment of a SIP message for selecting a network slice type for media traffic of an IMS session;

DETAILED DESCRIPTION

Figure 1:
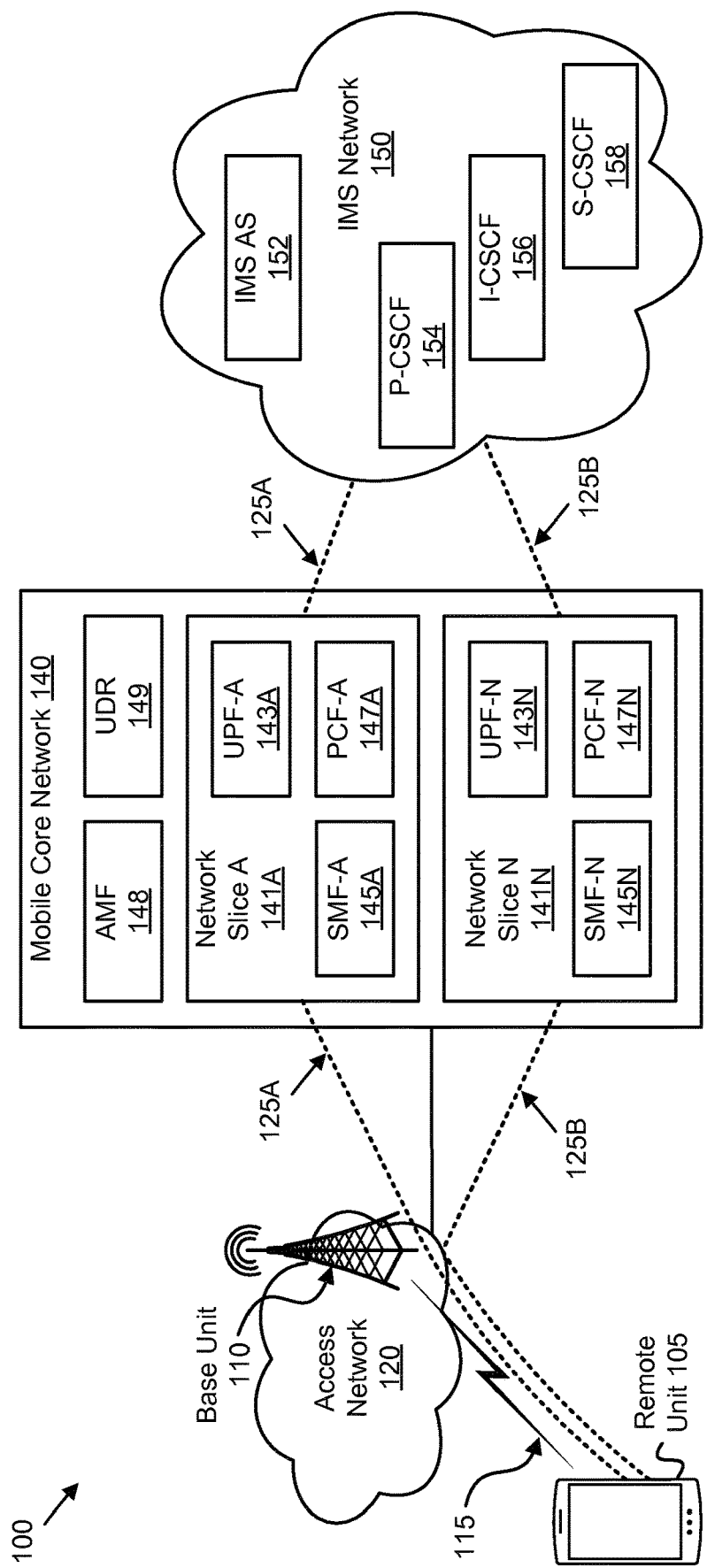
FIG. 1 is a schematic block diagram illustrating one embodiment of a wireless communication system for selecting a network slice type for media traffic of an IMS session.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

For selecting a network slice type for media traffic of an IMS session, systems, apparatuses, and methods are disclosed. To route IMS traffic via a preferred network slice instance, a UE may be configured with network slice selection policy ("NSSP") rules within UE route selection policy ("URSP") rules in order to assist the UE and routing traffic to a specific use session which maps to an appropriate network slice. When the UE needs sent traffic from an application, it matches the application ID to a selection policy rule and checks whether there is an active (e.g., established) PDU session that matches information contained in the matching selection policy rule. If no active PDU session qualifies, then the UE requests to establish a new PDU session that matches the information contained in the selection policy rule.

Disclosed herein are various solutions allowing a UE to decide how to route media of an IMS session when the UE has connections to the IMS network over multiple network slices. In general, IMS service identities are correlated with 5G network slice information in order to select the appropriate network slice. For example, the URSP rules may include traffic descriptors for various media types and/or IMS service types and network slice information for a network slice to be used to carry the IMS session media traffic. In a first solution, IMS signaling sent via a default network slice (e.g., the eMBB slice), and media traffic of the IMS session is routed via a different slice supporting the IMS application needs. In a second solution, the UE performs IMS registration via multiple 5G network slices and uses the appropriate 5G network slice to establish an IMS session according to the application needs.

In certain embodiments, the efficiency of IMS procedures is improved by letting the network entities know the nature of a SIP request. For example, when establishing a media session, a SIP invite request may include an element (e.g., in the header) showing the nature of the service and the 5G network slice needed for the service. Such information aids the IMS network entity to understand media traffic needs and to trigger establishment of the IMS media session over the appropriate network entities.

In certain embodiments, a PCF in the mobile core network is chosen depending on the 5G network slice. Here, the PCF may be chosen by the SMF and the UE indicates what 5G network slice is to be employed for media transportation of the IMS session. Accordingly, disclosed herein are techniques for selecting the PCF at the time of IMS session set up.

Disclosed is a first device that communicates with an IMS network via a mobile communication network supporting network connections with different slice types. The first device establishes a plurality of network connections, each one communicating via a different slice type of the mobile communication network. At least one network connection communicates via a slice type of the mobile communication network connecting to an IMS network.

The first device includes a processor that receives a first request to establish an IMS session. Here, the first request includes a plurality of media types. The processor determines that at least a first media type from the plurality of media types cannot be transferred in any of the plurality of network connections and transmits a second request to the mobile communication network to establish a new network connection to the IMS network. Here, the second request includes a slice type that is associated with the first media type. The processor also transmits a third request to the IMS network, after the establishment of the new network connection. Here, the third request includes an indication that the first media type should be communicated over the new network interface.

In various embodiments, the network connections are PDU sessions with the IMS network as the DNN. In various embodiments, the first request is received from an internal UE application, the second request is a PDU session establishment request, and the third request is a SIP Invite.

Disclosed is a second device having an IMS communications capable transceiver and a 5G network communications capable transceiver. The second device includes a processor that determines that media for an IMS service must be routed via a second network slice. In other embodiments, the processor determines that media must be routed to a second network slice based on the ICSI of the IMS service and information that denotes that media for this ICSI must be send to a second slice. In another embodiment, the processor determines the 5G network slice to route media traffic based on the ICSI, the IMS service identifier, and URSP policies provisioned in the UE.

Disclosed is a third device that is configured to operate as an IMS Application Server. Here, the third device includes a processor that determines that an IMS service with a specific ICSI must be routed over a second slice. The processor identifies an IMS Service identifier that has a one-to-one mapping with the ICSI of the IMS Service. Additionally, the third device interfaces with a 5G Network Function in order to inform the 5G network that media of an IMS service based on the IMS Service Identifier must be sent over a second slice and requests from the 5G network function a mapping of the 5G network slice to use by providing an IMS service identifier. In certain embodiments, the IMS Application Server configures an IMS Client with information that an IMS Service must be routed over a different slice.

Disclosed is a first process including transmitting traffic for IMS signaling in a first network interface and transmitting in a second network interface traffic for media for an IMS service associated with the IMS signaling information. In one embodiment, the IMS signaling is sent over the first slice and a device determines that media associated to an IMS service must be routed over a second slice. In further embodiments, the device uses the ICSI parameter and an additional indication within IMS signaling to determine that media must be routed over a second slice. In other embodiments, the device is configured (or provisioned) with information within IMS signaling that specify to which 5G network slice the traffic for media for an IMS service should be routed (e.g., based on ICSI). In one embodiment, the device is also configured with information on how an ICSI is mapped to an IMS Service Identifier.

In one embodiment of the first process, the device uses the IP address of the network slice used to route media for an IMS service to construct an SDP offer within a SIP INVITE request that is sent over the first network slice. In certain embodiments, an IMS Application Server determines that media for an IMS service must be routed over a different slice. In certain embodiments, the IMS Application Server informs a 5G Network that media for an IMS service must be sent over a second network slice. Here, the 5G network may provide routing policies to the device based on the determination of the IMS Application Server.

Disclosed is a second process that includes transmitting from a first network entity to a second network entity a first message containing a network slice information and an IMS service identifier. The second process includes transmitting from the second network entity to a third network entity a second message containing a S-NSSAI and the IMS service identifier. The second process includes transmitting from the third network entity to a device a configuration containing the S-NSSAI and the IMS service identifier. The second process also includes transmitting by the device to the first network entity a SIP message containing the IMS service identifier and an IP address for a PDU session.

In certain embodiments of the second process, the IP address for the PDU session identifies the S-NSSAI. In certain embodiments of the second process, the IMS service identifier may be an ICSI. In one embodiment, the ICSI identifies the S-NSSAI. In other embodiments of the second process, the IMS service identifier is an IMS application reference identifier (IARI). In one embodiment, the IARI identifies the S-NSSAI.

In the second process, the second network entity may transmit an updated USRP rule for the IMS service to the device. In various embodiments, the IMS service is identified by the IMS service identifier. In one embodiment, the IMS service identifier is ICSI. In another embodiment, the IMS service identifier is IARI. In various embodiments of the second process, the first network entity is an IMS application server, the second network entity is a 5G network function, and the third network entity is a device management server.

Disclosed is a third process that includes transmitting by a device to a first network entity a SIP message containing an IMS service identifier and a network interface. Here, the network interface is defined by at least one of a S-NSSAI, a DNN, and a SSC mode. The third process includes transmitting by the first network entity to a second network entity a session information and transmitting by the second network entity to a third network entity policy and charging control ("PCC") rules. The third process includes allocating by the third network entity resources to establish a QoS flow and transmitting by the device a media via the QoS flow.

In certain embodiments, the QoS flow is mapped the network interface. In certain embodiments, an IP address of the PDU session is the same as the IP address of the IMS signaling. In one embodiment of the third process, the second network entity transmits the session information after reception of the SIP message. In another embodiment of the third process, the second network entity transmits the session information after reception of a response to the SIP message.

In certain embodiments of the third process, the IMS service identifier and the network interface are associated. Where the IMS service identifier is an ICSI, then a header field of the SIP message may include the ICSI. Where the IMS service identifier is an IARI, then the header field of the SIP message may include the IARI.

Also disclosed is a fourth process that includes transmitting a first SIP INVITE message to a network entity from a device attached to a network slice. The SIP INVITE message may include a service identifier and a first SDP offer. In various embodiments, the first SDP offer includes a media type and an IP address of a PDU session for the media type. The fourth process also includes determining, by the network entity from the service identifier, a need for a second network slice for the media type and transmitting, by the network entity to the device, the need for the second network slice for the media type. Here, the fourth process includes transmitting, by the device attached to the second network slice to the network, a second SIP INVITE message containing the service identifier and a second SDP offer. Here, the second SDP offer includes the media type and the IP address of a PDU session for media type.

In one embodiment of the fourth process, the service identifier is an ICSI. In another embodiment of the fourth process, the service identifier is an IARI. In certain embodiments, transmitting the need for the second network slice for the media type includes sending a SIP message. In one embodiment, the SIP message is a SIP OPTIONS message. In another embodiment, the SIP message is a SIP '4xx response' message. In certain embodiments, transmitting the need for the second network slice for the media type includes transmitting a feature tag indicating media redirection.

In certain embodiments, the network entity determines the need for the second network slice by interfacing a 5G network function. In one embodiment, the 5G function is a network slice selection function ("NSSF"). In another embodiment, the 5G function is a policy control function ("PCF"). In yet another embodiment, the 5G function is a unified data management ("UDM").

FIG. 1 depicts a wireless communication system 100 for selecting a network slice type for media traffic of an IMS session, according to embodiments of the disclosure. In one embodiment, the wireless communication system 100 includes at least one remote unit 105, an access network 120 containing at least one base unit 110, wireless communication links 115, and a mobile core network 140. Even though a specific number of remote units 105, access networks 120, base units 110, wireless communication links 115, and mobile core networks 130 are depicted in FIG. 1, one of skill in the art will recognize that any number of remote units 105, access networks 120, base units 110, wireless communication links 115, and mobile core networks 130 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

In some embodiments, the remote units 105 may communicate with an IMS network 150 via a data path that passes through the mobile core network 140. For example, the mobile core network 140 may relay IMS signaling and/or media traffic between the remote unit 105 and the IMS application server 152 using the data path. Specifically, the remote unit 105 may establish a first data path 125A to the IMS network 150 via a first network slice ("network slice A" 141A) and simultaneously establish a second data path 125B to the IMS network 150 via a second network slice ("network slice B" 141B). For example, a remote unit 105 may establish a plurality of PDU sessions (e.g., data connections) via the mobile core network 140 and the access network 120. In one embodiment, each PDU session is associated with a particular network slice of the mobile core network 140.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 140 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a data network, like the Internet and private data networks, among other data networks. As depicted, the mobile core network 140 is also coupled to an IMS network 150. Each mobile core network 140 belongs to a single public land mobile network ("PLMN"). The present disclosure is not intended to be limited to the implementation of any particular wireless communication system architecture or protocol.

The mobile core network 140 includes multiple network slices 141A-141N (collectively "network slices 141"), each slice including several network functions ("NFs"). As depicted, the network slices 141 include a user plane function ("UPF") 143 and control plane functions, such as a Session Management Function ("SMF") 145 and a Policy Control Function ("PCF") 147. Moreover, the mobile core network 140 includes additional network functions (shared by the network slices 141), such as an Access and Mobility Management Function ("AMF") 148 and User Data Repository 149. Although specific numbers and types of network slices and network functions are depicted in FIG. 1, one of skill in the art will recognize that any number and type of network slices and/or network functions may be included in the mobile core network 140.

The IMS network 150 is a network for providing IP-based multimedia services, for example to the remote unit 105. As depicted, the IMS network 150 includes an IMS application server ("AS") 152. Here, the IMS AS 152 hosts and/or executes multimedia services. In certain embodiments, the IMS AS152 is an SIP application server. As depicted, the IMS network 150 also includes a plurality of call session control functions ("CSCF"), including the proxy-CSCF ("P-CSCF") 154, the interrogating-CSCF ("I-CSCF") 156, and serving-CSCF ("S-CSCF") 158. The CSCFs 154-158 may be SIP functions providing control plane services for the IMS network 150.

To select a network slice type for the media traffic of an IMS session, the remote unit 105 is configured with selection information, such as network slice selection policy rules and/or UE route selection policy rules. One example of a URSP rule includes a traffic descriptor, such as media type or an ICSI/IARI, an associated NSSP rule and an associated DNN rule. When the remote unit 105 needs to establish an IMS session, it uses the selection information to identify the appropriate network slice type. In various embodiments, different PDU sessions are established over different network slice types. Thus, the remote unit 105 determines which PDU session to use based on the selected network slice type.

As used herein, a PDU session refers to a network connection in the system 100 established by the remote unit 105. A PDU session is a logical connection between the remote unit 105 and a data network, such as the IMS network 150. A remote unit 105 may have multiple PDU sessions at a time. Each PDU session is distinguishable by a unique combination of Data Network Name ("DNN"), Session and Service Continuity ("SSC") mode, and/or network slice identifier (e.g., S-NSSAI). In various embodiments, each PDU session is associated with a different IP address.

In some embodiments, the remote unit 105 uses a default network slice, for example the network slice A 141A, to send IMS signaling for all IMS sessions and selects which network slice to send a request for resources for media, when beginning an IMS service. The selected network slice may be the default network slice or maybe a different network slice, depending on the media type. In other embodiments, the remote unit 105 registers with IMS network 150 over multiple network slices, selects which network slice to send a request for resources for media, when beginning an IMS service, and sends the IMS signaling on the same slice as the media traffic for that IMS service. These concepts are discussed in further detail below.

Figure 2:
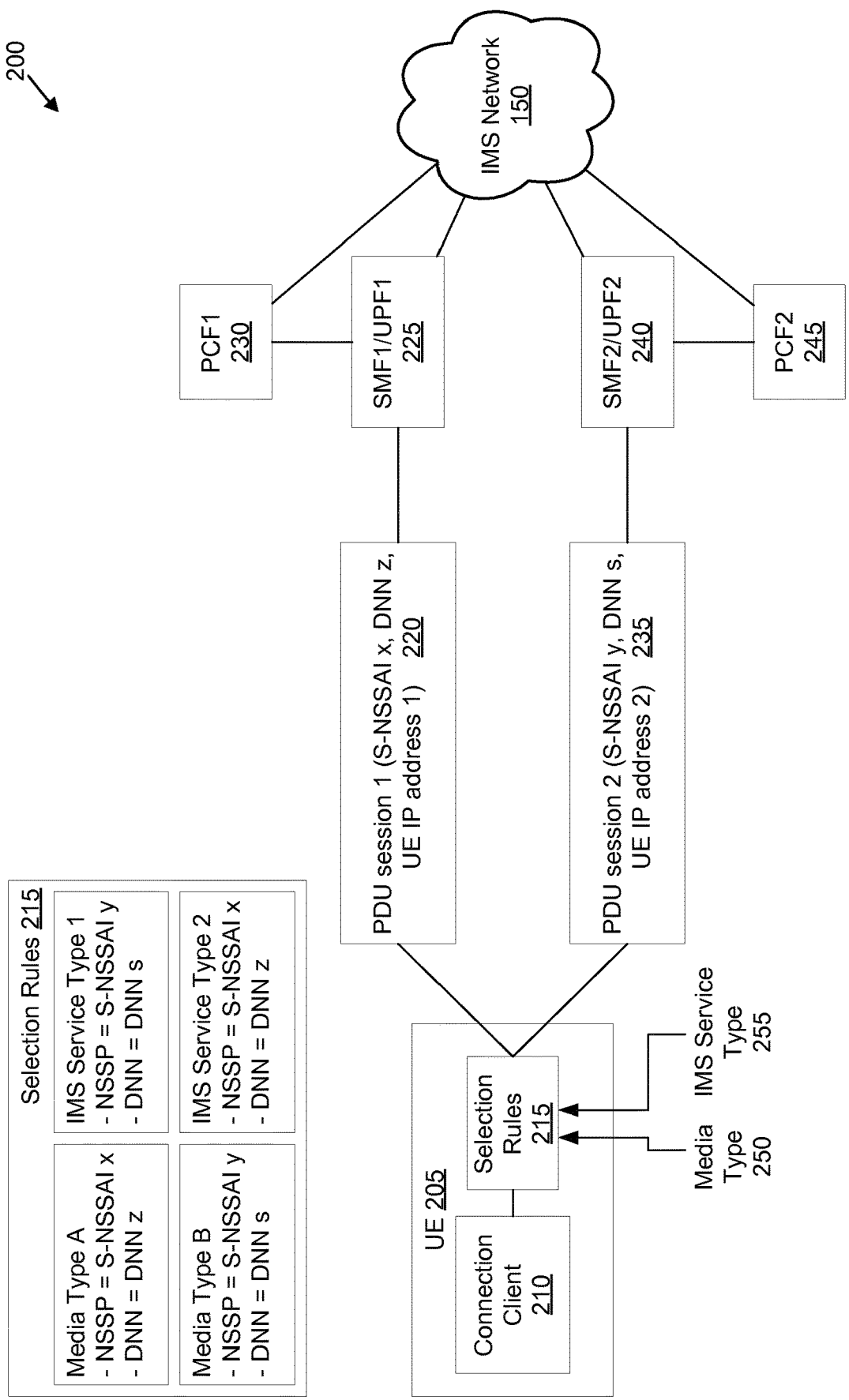
FIG. 2 is a block diagram illustrating one embodiment of a network architecture for selecting a network slice type for media traffic of an IMS session.

FIG. 2 depicts a network architecture 200 used for selecting a network slice type for media traffic of an IMS session, according to embodiments of the disclosure. The network architecture 200 may be a simplified embodiment of the wireless communication system 100. As depicted, the network architecture 200 includes a UE 205 that connects to the IMS network 150 over a plurality of network connections, depicted here as PDU sessions 220, 235. The UE 205 may be one embodiment of the remote unit 105 described above. The UE 205 includes a connection client 210 and selection rules 215.

The UE 205 establishes a first PDU session 220 with a first network slice (e.g., "S-NSSAI x"), the first network slice including a first SMF/UPF 225 and a first PCF 230. The UE 205 also establishes a second PDU session 235 with a second network slice (e.g., "S-NSSAI y"), the second network slice including a second SMF/UPF 240 and a second PCF 245. The UE 205 selects a network slice type for media traffic of an IMS session and determines whether the selected network slice type is supported by the first PDU session 220 or second PDU session 235. Note that if neither of the PDU sessions 220, 235 support the selected network slice type, then the UE 205 may establish a new PDU session that supports the appropriate network slice type.

The UE 205 uses the selection rules 215 to select the appropriate network slice type. As depicted, the UE 205 may make the selection based on a media type 250 and/or an IMS service type 255. Here, the selection rules 215 may include entries specific to various media types of IMS sessions and/or IMS service types of IMS sessions. In certain embodiments, the connection client 210 uses the selection rules 215 to select the appropriate PDU session based on the characteristics of the requested IMS session.

Figure 3:
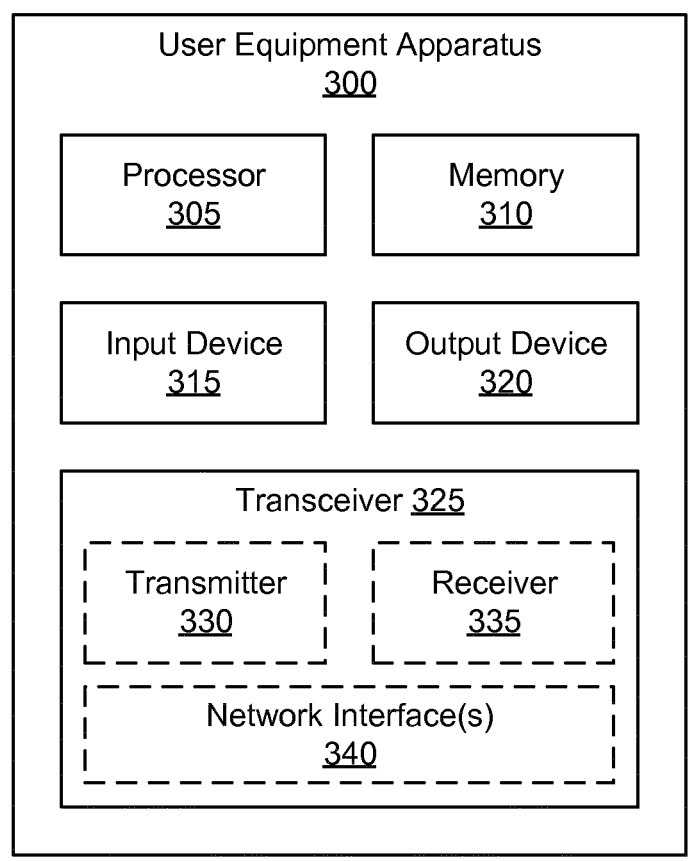
FIG. 3 is a schematic block diagram illustrating one embodiment of a user equipment apparatus for selecting a network slice type for media traffic of an IMS session.

FIG. 3 depicts one embodiment of a user equipment apparatus 300 that may be used for selecting a network slice type for media traffic of an IMS session, according to embodiments of the disclosure. The user equipment apparatus 300 may be one embodiment of the SMF 146. Furthermore, the user equipment apparatus 300 may include a processor 305, a memory 310, an input device 315, an output device 320, and a transceiver 325. In some embodiments, the input device 315 and the output device 320 are combined into a single device, such as a touch screen. In certain embodiments, the user equipment apparatus 300 does not include any input device 315 and/or output device 320.

As depicted, the transceiver 325 includes at least one transmitter 330 and at least one receiver 335. Additionally, the transceiver 325 may support at least one network interface 340. Here, the at least one network interface 340 facilitates communication with a eNB or gNB (e.g., using the Uu interface). Additionally, the at least one network interface 340 may include an interface used for communications with an UPF, an SMF, and/or a P-CSCF.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In some embodiments, the processor 305 receives a first request establish an IMS session with an IMS network. Here, the first request includes a plurality of media types. The first request may be received from an application running on the processor 305, such as a media client, operating system, or other software application. Note that the IMS network is reachable via plurality of network connections established via the transceiver 325 with a mobile communication network. Here each network connection communicates via a different network slice type of the mobile communication network.

In some embodiments, the processor 305 selects a network connection to be used for communicating media traffic for each media type of the plurality of media types included in the first request. In certain embodiments, selecting the network connections include selecting a network slice type to be used for each media traffic type and determining a network connection associated with each of the selected network slice types. As discussed in greater detail below, selecting the network slice type may include using selection policy rules, for example, NSSP rules within a URSP.

In various embodiments, the processor 305 transmits, using a first of the network connections, a IMS session request message to IMS network. In such embodiments, the IMS session request message may indicate one or more parameters to be used for communicating the media traffic for each media type over the selected network connection. In certain embodiments, the processor 305 communicates IMS signaling for the request IMS session using the first of the network connections and offloads media traffic of at least one media type to a second of the network connections. In further embodiments, the processor 305 may offload the media traffic in response to determining that media traffic of the at least one media type for the request IMS session is not to be sent on the first of the network connections. For example, the network slice type of the first network connection may not support the at least one media type, thus requiring offloading to the second network connection.

In certain embodiments, when selecting the network connection to be used for communicating the media traffic for each media type, the processor 305 may determine a network slice type for routing media traffic of the requested IMS session using the route selection policy, where the selection is based on the requested media type. In other embodiments, the selection may be based on an IMS service identifier, such as an ICSI or an IARI, of the requested IMS session.

In one embodiment, the route selection policy may map a specific IMS service identifier (e.g., ICSI or IARI) to a specific S-NSSAI. In another embodiment, the route selection policy may map a specific media type to a specific S-NSSAI. Note that the specific S-NSSAI identifies a specific network slice of the mobile communication network. Moreover, the processor's 305 may further determine the network slice type based on an additional indication within IMS signaling. In various embodiments, the ICSI/IARI to S-NSSAI mapping is configured in the user equipment apparatus 300 by a policy function in the mobile communication network, such as the PCF 147.

In certain embodiments, when transmitting the IMS session request message, the processor 305 sends a first SIP INVITE request to the IMS network, for example as a response to receiving the request to establish an IMS session. In such embodiments, the processor 305 may receive an SIP message from IMS network. Here the SIP message indicates media redirection to a second one of the multiple network connections. Additionally, the processor 305 may determine offload media traffic for the requested IMS session to a the second of the network connections in response to receiving the SIP message indicating media redirection. In a further embodiment, the processor 305 may send a second SIP INVITE request IMS network using the first of the network connections in response to receiving the SIP message indicating media redirection.

In various embodiments, the plurality of network connections is a plurality of PDU sessions established with the mobile communication network. Here, each PDU session specifies at least one of a DNN, an SSC mode, and a network slice identifier. Moreover, the plurality of PDU sessions may be distinguishable by the combination of DNN, SSC mode, and network slice identifier. In such embodiments, when selecting the network connection to be used for communicating the media traffic, the processor 305 may determine that a first media type of the plurality of media types cannot be transferred on any of the network connections already established. Here, the processor 305 transmits a request to the mobile communication network to establish a new network connection (e.g., a new PDU session) to the IMS network. Here, the connection establishment request includes a slice type associated with the first media type. Moreover, the processor 305 transmits another request to the IMS network (e.g., a second IMS session request) using the first of the network connections after establishing the new network connection (e.g., the new PDU session). Here, the second IMS session request includes an indication that the first media type is to be communicated over the new network connection.

In certain embodiments, a PDU session corresponding to the first of the network connections has the IMS network as the DNN. In certain embodiments, the connection establishment request is a request to establish a new PDU session and the second IMS session request is an SIP INVITE request. In such embodiments, the SIP INVITE request includes an SDP offer. In one embodiment, the SDP offer may include an indication of the first media type and an IP address of the second of the network connections. Here, each of the plurality of network connections may be allocated a different IP address.

In some embodiments, the processor registers with the IMS network via the first of the plurality of network connections prior to receiving the first request (e.g., the request to establish IMS session). In certain embodiments, the processor registers with the IMS network via a second of the network connections in response to determining that media traffic of at least one media type of the requested IMS session is not to be sent on the first of the network connections. In such embodiments, registering with IMS network via the second of the network connections includes: sending a SIP registration request that indicates the user equipment apparatus 300 is capable of multiple GRUU identities, and sending an SIP INVITE request via the second of the network connections. Here, processor 305 receives a new GRUU identity from the IMS network in response to the SIP registration request. In some embodiments, the processor 305 registers with the IMS network via each of the plurality of network connections, each network connection associated with a PDU session over a different network slice. Here, each of the plurality of network connections is associated with a different GRUU.

In one embodiment, the first request to establish an IMS session with the IMS network request a certain media type. Here, the processor 305 determines to register with the IMS network via the second of the network connections based on the requested media type. Moreover, the second of the network connections is over a network slice associated with the requested media type. In another embodiment, the first request to establish an IMS session with the IMS network requests a certain IMS service identifier. Here, the processor 305 determines to register with the IMS network via the second of the network connections based on the requested IMS service identifier. Moreover, the second of the network connections is over a network slice associated with the requested IMS service identifier. Examples of an IMS service identifier include an ICSI and an IARI.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data relating to selecting a network slice type for media traffic of an IMS session, for example storing policy rules, network slice mappings, GRUU identities, IP addresses, and the like. In certain embodiments, the memory 310 also stores program code and related data, such as an operating system or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

The transceiver 325 communicates with one or more network functions of a mobile communication network. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335.

Figure 4:
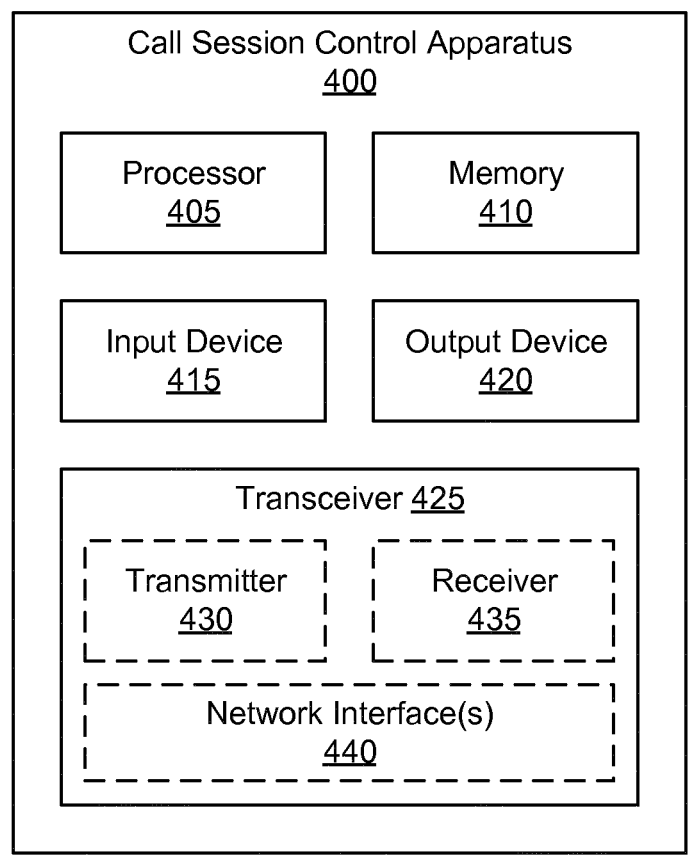
FIG. 4 is a schematic block diagram illustrating one embodiment of a call session control apparatus for selecting a network slice type for media traffic of an IMS session.

FIG. 4 depicts one embodiment of a call session control apparatus 400 that may be used for selecting a network slice type for media traffic of an IMS session, according to embodiments of the disclosure. The call session control apparatus 400 may be one embodiment of the P-CSCF 154. Furthermore, the call session control apparatus 400 may include a processor 405, a memory 410, an input device 415, an output device 420, and a transceiver 425. In some embodiments, the input device 415 and the output device 420 are combined into a single device, such as a touch screen. In certain embodiments, the call session control apparatus 400 does not include any input device 415 and/or output device 420.

As depicted, the transceiver 425 includes at least one transmitter 430 and at least one receiver 435. Additionally, the transceiver 425 may support at least one network interface 440. Here, the at least one network interface 440 facilitates communication with a remote unit 105, such as the UE 205, with other network functions in a mobile core network 140 and/or IMS core network, such as the PCF 147, S-CSCF, I-CSCF, and the like.

The processor 405, in one embodiment, may include any known controller capable of executing computer-readable instructions and/or capable of performing logical operations. For example, the processor 405 may be a microcontroller, a microprocessor, a CPU, a GPU, an auxiliary processing unit, a FPGA, or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In some embodiments, the processor 405 receives a first SIP INVITE request from a remote unit (e.g., UE). Here, the SIP INVITE request includes an IMS service identifier and network slice information. In various embodiments, the IMS service identifier is one of an ICSI and an IARI. Additionally, the network slice information may be one of: a S-NSSAI, a DNN, and an SSC mode.

In certain embodiments, the processor 405 identifies a policy function (e.g., a PCF) must be selected in a first network slice based on the SIP INVITE request. For example, the first network slice may be identified by the network slice information included in the SIP INVITE request. In certain embodiments, the processor 405 controls the transceiver 425 to transmit session information for the SIP INVITE request to an IMS network core, such as an S-CSCF.

Additionally, processor 405 requests resources the first network slice (e.g., resources to support the IMS session requested by the unit).

In some embodiments, the processor 405 receives a SIP response to the first SIP INVITE request from an IMS application server. Here, the processor 405 transmits the transmits session information in response to receiving the SIP response. In other embodiments, the processor 405 transmits the session information after receiving the SIP INVITE request, but prior to receiving the SIP response from the IMS application server.

The memory 410, in one embodiment, is a computer readable storage medium. In some embodiments, the memory 410 includes volatile computer storage media. For example, the memory 410 may include a RAM, including DRAM, SDRAM, and/or SRAM. In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to selecting a network slice type for media traffic of an IMS session, for example storing session information, UE identifiers, network slice identifiers, and the like. In certain embodiments, the memory 410 also stores program code and related data, such as an operating system or other controller algorithms operating on the call session control apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

The transceiver 425 communicates with a remote unit (e.g., a UE 205), one or more network functions of a mobile communication network (e.g., the PCF 147), and one or more network functions of an IMS network (e.g., the IMS AS 152). The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435.

Figure 5:
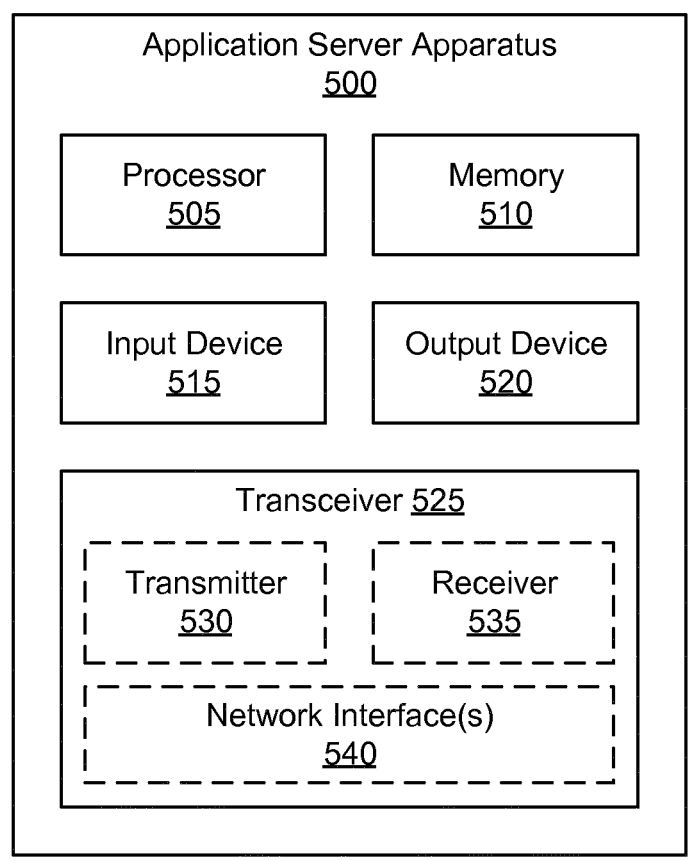
FIG. 5 is a schematic block diagram illustrating one embodiment of an application server apparatus for selecting a network slice type for media traffic of an IMS session.

FIG. 5 depicts one embodiment of an application server apparatus 500 that may be used for selecting a network slice type for media traffic of an IMS session, according to embodiments of the disclosure. The application server apparatus 500 may be one embodiment of the IMS AS 152. Furthermore, the application server apparatus 500 may include a processor 505, a memory 510, an input device 515, an output device 520, and a transceiver 525. In some embodiments, the input device 515 and the output device 520 are combined into a single device, such as a touch screen. In certain embodiments, the application server apparatus 500 does not include any input device 515 and/or output device 520.

As depicted, the transceiver 525 includes at least one transmitter 530 and at least one receiver 535. Additionally, the transceiver 525 may support at least one network interface 540. Here, the at least one network interface 540 facilitates communication with a remote unit 105, such as the UE 205, with other network functions in a mobile core network 140 and/or IMS network 150, such as the PCF 147, P-CSCF 154, and the like.

The processor 505, in one embodiment, may include any known controller capable of executing computer-readable instructions and/or capable of performing logical operations. For example, the processor 505 may be a microcontroller, a microprocessor, a CPU, a GPU, an auxiliary processing unit, a FPGA, or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In some embodiments, the processor 505 receives a first SIP INVITE request from a remote unit (e.g., a UE) via a first network slice. Here, the first SIP INVITE request is a request for an IMS service and includes a media indication. In certain embodiments, the processor 505 determines that media traffic for the Imus server is to be routed via a second network slice different than the first. In such embodiments, the processor 505 controls the transceiver 525 to send a SIP response to the mobile unit.

In various embodiments, the SIP response indicates that the media traffic for the IMS service is to be routed via a different network slice than the slice over which the IMS service request was received. In some embodiments, sending the SIP response include sending one of an SIP failure response and an SIP redirection response. In such embodiments, the SIP response indicates that the remote unit is to check routing policy rules to identify the second network slice.

In certain embodiments, sending the SIP response to the mobile unit include sending assistance information to remote unit. Here, the assistance information maps and IMS service identifier to an S-NSSAI of the second network slice. The IMS service identifier may be in ICSI and/or an IARI.

In certain embodiments, the processor 505 configures the remote unit with routing policy rules. In such embodiments, the routing policy rules map specific IMS service identifiers to specific S-NSSAIs. In some embodiments, the routing policy rules are NSSP rules included within a URSP configured in the remote unit.

The memory 510, in one embodiment, is a computer readable storage medium. In some embodiments, the memory 510 includes volatile computer storage media. For example, the memory 510 may include a RAM, including DRAM, SDRAM, and/or SRAM. In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to selecting a network slice type for media traffic of an IMS session, for example storing routing policy rules, assistance information, SIP messages, and the like. In certain embodiments, the memory 510 also stores program code and related data, such as an operating system or other controller algorithms operating on the application server apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

The transceiver 525 communicates with a remote unit (e.g., a UE 205), one or more network functions of a mobile communication network (e.g., the PCF 147), and one or more network functions of an IMS network (e.g., the P-CSCF 154). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages. The transceiver 525 may include one or more transmitters 530 and one or more receivers 535.

Figure 6:
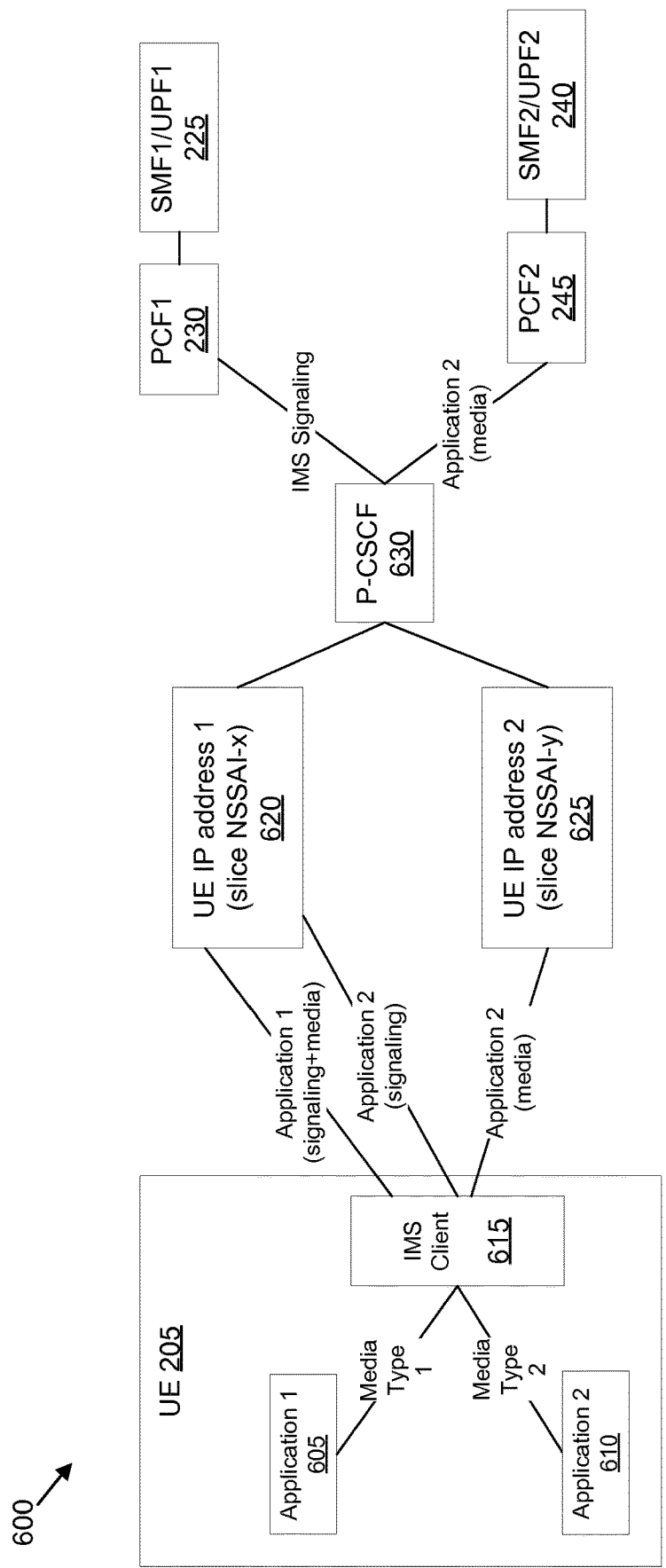
FIG. 6 is a block diagram illustrating one embodiment of a network architecture for selecting a network slice type for media traffic of an IMS session.

FIG. 6 depicts a network architecture 600 for selecting a network slice type for media traffic of an IMS session, according to embodiments of the disclosure. As depicted, the network architecture 600 includes a UE 205 having stalled there in a first application 605 at a second application 610. Here, the first application 605 is associated with a first media type, while the second application 610 is associated with a second media type. The UE 205 also includes an IMS client 615.

In various embodiments, the UE 205 is associated with a first UE IP address 620 allocated to a network connection (e.g., PDU session) established over a first network slice. The UE 205 is also associated with a second UE IP address 625 allocated to a network connection (e.g., PDU session) established over a second network slice. Here, the different network slices for different IMS service requirements.

As depicted, the UE 205 connects to the P-CSCF 630 via the aforementioned network connections. The P-CSCF 630 is a part of the IMS core network. The P-CSCF 630 has network connections to a first PCF 230 in the first network slice and a second PCF 245 in the second network slice. Moreover, the first PCF 230 and second PCF 245 are coupled to the first SMF/UPF 225 and second SMF/UPF 240, respectively.

The UE 205 differentiates to which 5G network slice it is to send media traffic of the requested IMS session based on the type of media requested by the applications. Here, the IMS client 615 may identify the media types associated with first application 605 and second application 610. In certain embodiments, the UE 205 uses an IMS service identifier, such as an ICSI and/or an IARI of the IMS session to identify the media type. Consequently, the UE 205 may use selection policy rules to identify which 5G network slice may send user plane traffic for the identified media type. Note that the ICSI and/or IARI may be used to define a special routing within the IMS network depending on the IMS application requirements. In some embodiments, the ICSI and IARI may be used to define how to route IMS user plane traffic via different network slices.

In the depicted embodiment, the UE 205 sends IMS signaling for the first application 605 via the network connection associated with the first UE IP address 620. Moreover, the UE 205 sends IMS signaling for the second application 610 via the same network connection. Here, the first network slice may be a default network slice over which all IMS signaling is sent. However, in various embodiments, the first network slice does not support a media type of the second application 610. Here, the UE 205 determines that the first network slice does not support the media type and uses selection policy rules to determine that the second upper slice network supports the media type of the second application 610. Accordingly, the UE 205 sends IMS media traffic for the first application 605 over the first network slice, while sending IMS media traffic for the second application 610 over the second network slice.

In various embodiments, the UE 205 is configured so that media traffic of an IMS session may be send over a different 5G network slice than the signaling traffic. For example, the network may provide the UE 205 with updated URSP rules, e.g., indicating that for certain media types the media of an IMS session is to be routed to a different 5G network slice than the signaling traffic for that IMS session. Alternatively, the URSP rules may indicate that an IMS session with a specific IMS Service identifier is to be routed to a different 5G network slice. In certain embodiments, an IMS Application Server (AS) or a DM server may configure the IMS client in the UE 205 so that the media traffic of an IMS session is sent by a different 5G network slice. For example, the IMS AS or DM server may configure the UE with ICSI to S-NSSAI mapping information.

Here, parameters that may be used to indicate to the UE 205 that media traffic of an IMS session is to be routed over a different slice (e.g., indicating that said media traffic cannot be sent over the default slice) may include, but are not limited to, a media type of an IMS session, ICSI, IARI, and combinations thereof. For example, the UE 205 may be configured (or provisioned) with a configuration parameter that, for a certain media type, the media traffic is to be send via the different 5G network slice. In another example, the UE may be configured (or provisioned) with a configuration parameter that, for a certain ICSI and/or IARI, the media traffic is to be send via the different 5G network slice. Moreover, these configuration parameters may indicate a network slice type over which the media traffic is to be sent (e.g., indicating a S-NSSAI).

In certain embodiments, a 5G network function (such as the PCF 147 or UDR 149) configures the UE 205 with updated URSP rules for selecting a network slice type for media traffic of an IMS session. Here, the updated URSP rules may contain a traffic descriptor that matches to the media type requested by the IMS application. Alternatively, the updated URSP rules may contain a traffic descriptor that matches to the ICSI and/or IARI of the IMS service.

In certain embodiments, an IMS AS may configure the UE 205, e.g., with an IMS configuration for selecting a network slice type for media traffic of an IMS session. In one embodiment, the URN of the IMS service may be constructed as "urn:3gpp-service.ims.icsi.<IMS service>.snssai.<slice_name>". Here, the value of "<IMS service>" is set to identify an IMS service, such as MMTEL. Similarly, the value of "<slice_name>" may be set to identify the name of the 5G network slice, such as "eMBB."

As an example, the URN "urn:3gpp-service.ims.icsi.mmtel.snssai.embb" may indicate to the UE 205 that for IMS service "mmtel" the media is to be routed over the 5G network slice "embb." Moreover, the IMS AS may also configure additional parameters, such as the DNN or the SSC mode required for this service. As will be appreciated by one of skill in the art, the order of the IMS service name and the network slice name may be shifted in the URN, without being limited to the above format. In certain embodiments, the identification string "snssai" may be dropped, with the URN including the name of IMS service and the 5G network slice, thus having the URN format "urn:3gpp-service.ims.icsi.<IMS service>.<slice_name>." An example of this later form is "urn:3gpp-service.ims.icsi.mmtel.embb."

In one embodiment, the URN for the 5G network slice may be constructed as one of: "urn:3gpp-service.ims.icsi.snssai.<slice_name>", "urn:3gpp-service.ims.icsi.<slice_name>", or "urn:3gpp-snssai.ims.icsi.<slice_name>". Again, the value of "<slice_name>" is the name of the 5G network slice, such as "eMBB." As an example, the URN "urn:3gpp-snssai.ims.icsi.embb" may indicate to the UE 205 that the IMS service, which may be identified by another URN like urn:3gpp-service.ims.icsi.<IMS service>, is to be routed over the 5G network slice "embb." Moreover, the IMS service ICSI URN and the 5G network slice ICSI URN may both be employed together to specify the IMS service for which 5G network slice.

In certain embodiments, the URN of the IMS service may be constructed as "urn:3gpp-service.ims.iari.<IMS service>.snssai.<slice_name>", where to value of "<IMS service>" identifies an IMS service, such as MMTEL, and the value of "<slice_name>" identifies the name of the 5G network slice such as eMBB. As an example, the URN urn:3gpp-service.ims.iari.mmtel.snssai.embb may be used to indicate to the UE 205 that for IMS service "mmtel" the media may be routed over the "embb" 5G network slice. The IMS AS may also configure additional parameters, such as the DNN or the SSC mode required for this service. As will be appreciated by one of skill in the art, the order of the IMS service name and the network slice name may be shifted in the URN, without being limited to the above format. Additionally, the identification string "snssai" may be dropped, with the URN including the name of IMS service and the 5G network slice, thus having the URN format "urn:3gpp-service.ims.iari.<IMS service>.<slice_name>," for example "urn:3gpp-service.ims.iari.mmtel.embb."

In one embodiment, the URN for the 5G network slice may be constructed as one of: "urn:3gpp-service.ims.iari.snssai.<slice_name>", "urn:3gpp-service.ims.iari.<slice_name>", or "urn:3gpp-snssai.ims.iari.<slice_name>" where the value of "<slice_name>" is the name of the 5G network slice, such as "eMBB." As an example, the URN "urn:3gpp-snssai.ims.iari.embb" may indicate to the UE 205 that the IMS service which may be identified by another URN like "urn:3gpp-service.ims.iari.<IMS service>" may be routed over the "embb" 5G network slice. Moreover, the IMS service IARI URN and the 5G network slice IARI URN may both be employed together to specify the IMS service for which 5G network slice.

In one embodiment the IMS AS may configure the UE 205 so that for a specific IMS service, e.g., identified by an ICSI and/or IARI, the UE 205 is to check its PDU session network configuration (e.g., URSP rules) to identify the PDU session to send the media traffic.

In order to support such approach, the IMS AS may need to indicate to a 5G network function (e.g., PCF, NEF, etc.) that media of a certain service is to be routed via a separate network interface (e.g., routed via different network slice). Here, the IMS AS may provide to the 5G network function an IMS service communication identifier (e.g., mapped to an ICSI) and/or an IMS application reference identifier (e.g., mapped to an IARI). Such request may trigger the 5G network to provide updated UE policies to the UE 205, for example, containing a policy for the IMS Service. Moreover, the IMS AS may optionally obtain from the 5G network function the ICSI and/or IARI to S-NSSAI mapping for media flows. In such embodiments, the IMS AS may obtain the information by a 5G network function using a service based approach.

Figure 7:
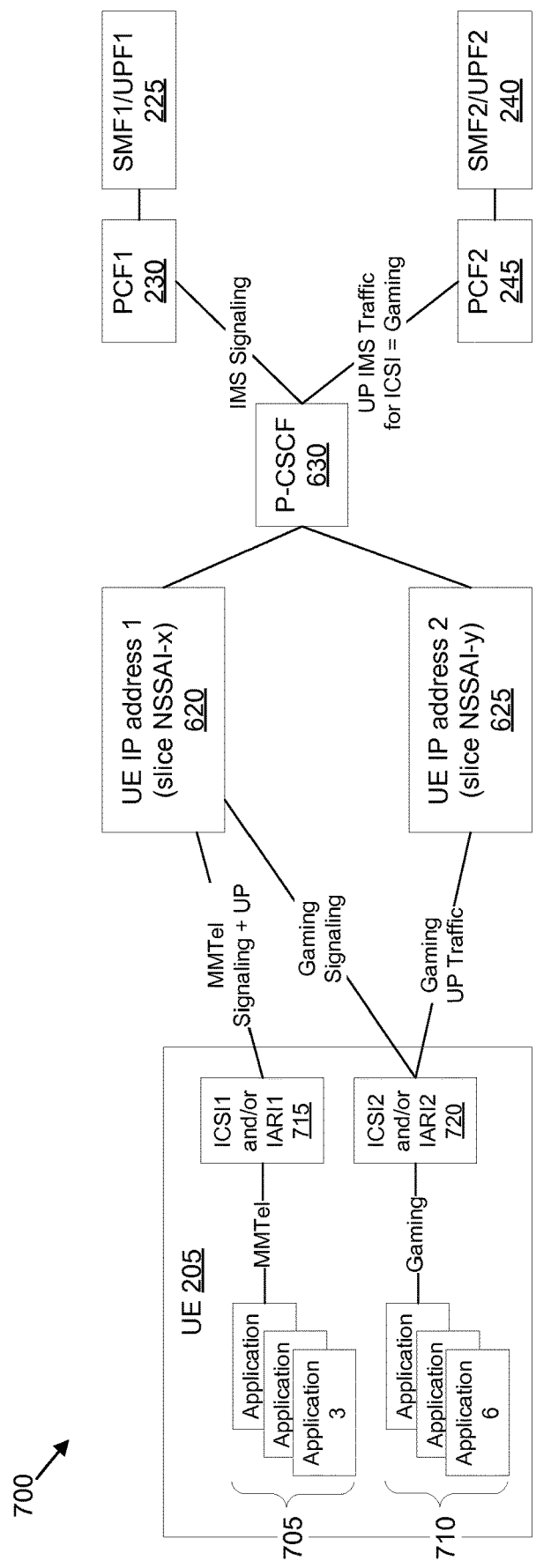
FIG. 7 is a block diagram illustrating another embodiment of a network architecture for selecting a network slice type for media traffic of an IMS session.

FIG. 7 depicts a network architecture 700 for selecting a network slice type for media traffic of an IMS session, according to embodiments of the disclosure. The network architecture 700 includes the UE 205 having established a first PDU session with the P-CSCF 630 associated with the first UE IP address 620 and also having established a second PDU session with the P-CSCF 630 associated with the second UE IP address 625. Here, the UE 205 includes a first set of applications 705 corresponding to a first IMS service type 715 (e.g., "MMTel") and a second set of applications 710 corresponding to a second IMS service type 720 (e.g., "Gaming"). Here, the different IMS service types may be indicated by an ICSI and/or an IARI.

The UE 205 decides to route IMS media traffic based on the IMS service identifier, e.g., the ICSI and/or IARI. Specifically, the UE 205 may be configured with selection policy rules mapping the ICSI and/or IARI of an IMS session to choose an appropriate 5G network slice for various media types of the requested IMS session. As depicted, the UE 205 routes IMS signaling for both the first IMS service type 715 and the second IMS service type 720 via the first network slice (e.g., associated with the first UE IP address 620). Also, while the UE 205 routes IMS media traffic for the first IMS service type 715 via the first network slice, the UE 205 offloads IMS media traffic for the second IMS service type 720 to the second network slice associated with the second UE IP address 625.

While FIG. 6 depicts the UE 205 routing IMS media traffic based on an identified media type and FIG. 7 depicts the UE 205 routing IMS media traffic based on an IMS service type, in other embodiments, the UE 205 may determine how to route the media traffic based on a combination of media type and IMS service identifier (e.g., ICSI and/or IARI).

FIG. 8 depicts a diagram 800 of a SIP INVITE request for selecting a network slice type for media traffic of an IMS session, according to embodiments of the disclosure. Note here that the SIP INVITE message includes an IP address 805 of the PDU session used for IMS signaling (e.g., via the default 5G network slice) as well as an IP address 810 of the PDU session used for the media traffic. Additionally, the SIP INVITE request includes an SDP offer 815.

When a UE attaches to a 5G network, the UE also registers to the IMS network by establishing a PDU session over the appropriate network slice requesting a DNN for IMS, taking into account the matching USRP rule. Based on the UE configuration, when an application request to initiate an IMS service, the UE may check the UE configuration (e.g., URSP rules or IMS configuration) to identify how the requested media type is to be routed over the 5G network.

In some embodiments, the UE may determine that the media type is to be sent via a different 5G network slice than the default network slice. In such embodiments, the UE may check the URSP rules to determine whether there is an existing PDU session that can be used for the media. If no such PDU session is established, then the UE establishes a new PDU session for sending media traffic over the appropriate 5G network slice. After the selecting the appropriate PDU session, the UE may use an IP address allocated to the selected PDU session in order to construct an STP offer within a SIP INVITE request. In certain embodiments, the UE sends the SIP INVITE request via the default network slice (e.g., via the PDU session used for IMS signaling).

Further, the UE they also be configured with additional routing options. For example, instead of selecting a network slice, the UE may be configured that for certain media types (or for certain IMS service identifiers) the media traffic of the IMS session is to be sent via PDU session having a specific SSC mode and/or DNN.

Figure 9:
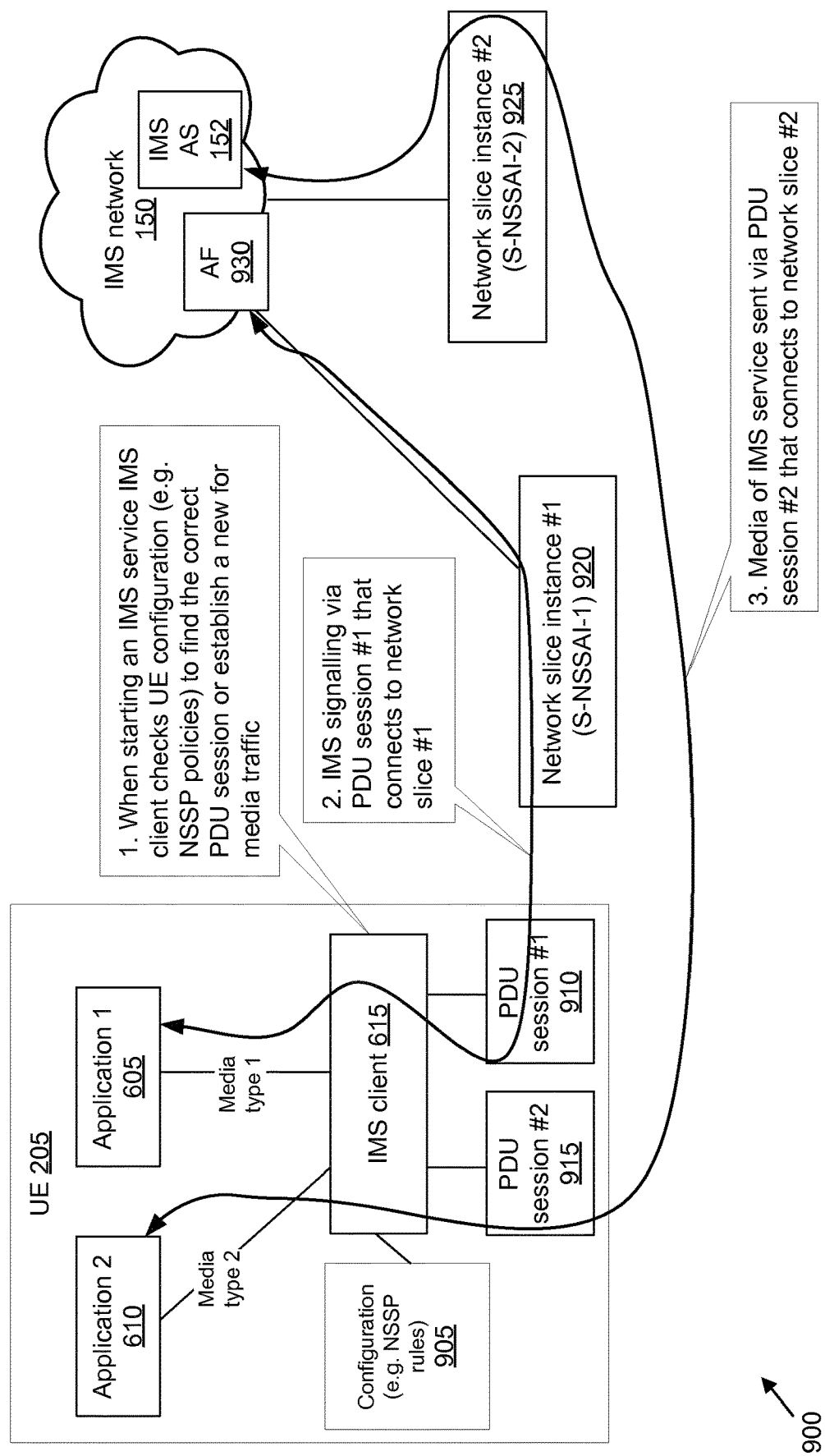
FIG. 9 is a block diagram illustrating one embodiment of a network architecture and related procedure for selecting a network slice type for media traffic of an IMS session.

FIG. 9 depicts a network architecture 900 for selecting a network slice type for media traffic of an IMS session, according to embodiments of the disclosure. The network architecture 900 includes the UE 205, the first application 605, the second application 610, the IMS client 615, and the IMS network 150. The network architecture 900 includes a first network slice instance 920 and a second network slice instance 925. Here, the first network slice instance 920 is of a different type than the second network slice instance 925.

As depicted, the UE 205 includes a UE configuration 905 (e.g., a set of NSSP rules). Moreover, the UE 205 establishes a first PDU session 910 via the first network slice instance 920 and establishes a second PDU session 915 via the second network slice instance 925. The IMS network 150 includes an IMS application server ("AS") 152 and further includes an application function 930.

When the UE 205 attaches in a 5G network the UE 205 registers to the IMS network 150 by establishing a PDU session over the appropriate slice requesting a DNN for IMS, taking into account the URSP rule. Based on the UE configuration 905 when an application (e.g., one of the first application 605 and the second application 610) requests to initiate an IMS service, the IMS client 615 may check the UE configuration 905 (e.g., NSSP rules) to identify how the requested media is to be routed over the 5G network. Here, the NSSP rules indicate the appropriate network slice for the media traffic and the IMS client 615 determines whether there is an established PDU session over the appropriate network slice suitable for the media traffic, or whether a new PDU session needs to be established.

In various embodiments, the UE 205 registers with the IMS network via the first network slice instance 920. However, the IMS client 615 may determine (e.g., based on the UE configuration 905) that media for a requested IMS session is to be send by a different 5G network slice (e.g., the second network slice instance 925). In such a case, the IMS client 615 determines if there is an existing PDU session that can be used. If not, the UE 205 establishes a new PDU session for routing the media traffic over the appropriate 5G network slice.

In the depicted embodiment, the UE 205 offloads the media traffic to the second network slice instance 925. Here, the IMS client 615 continues to communicate IMS signaling via the first PDU session 910 that uses the first network slice instance 920. However, media of the IMS service is sent via the second PDU session 915 that uses the second network slice instance 925.

Figure 10:
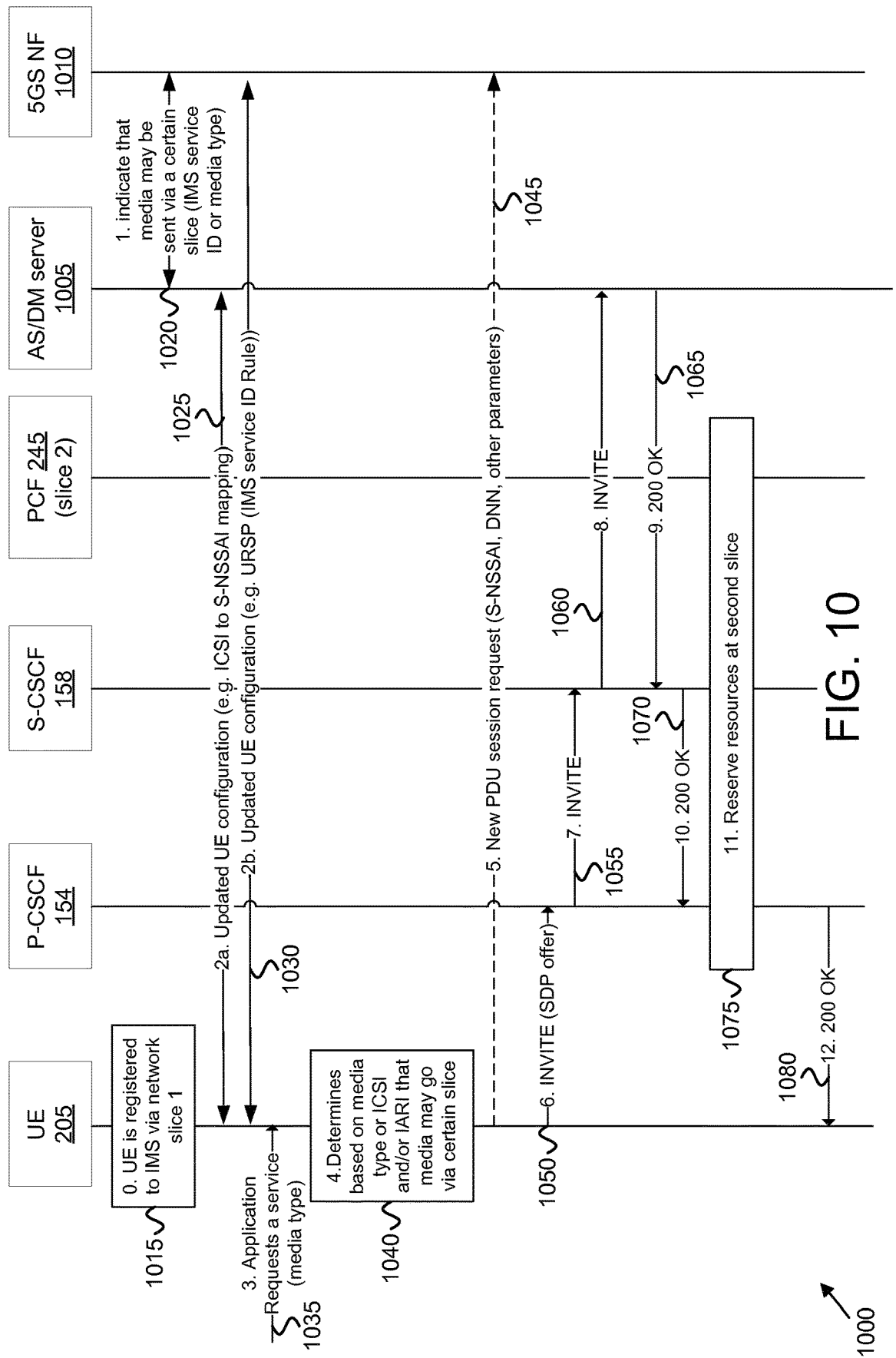
FIG. 10 is a block diagram illustrating one embodiment of a network procedure for selecting a network slice type for media traffic of an IMS session.

FIG. 10 depicts a network procedure 1000 for reserving resources on a selected network slice for media traffic of an IMS session, according to embodiments of the disclosure. The network procedure 1000 involves the UE 205, the P-CSCF 154, the S-CSCF 158, an AS/DM server 1005, and a 5G system network function 1010 ("5GS NF").

The AS/DM server 1005 is an application server which may be collocated with a device management server. In one embodiment, the 5GS NF 1010 is a NSSF. In another embodiment, the 5GS NF 1010 is a PCF (e.g., in the first network slice). In yet another embodiment, the 5GS NF 1010 is the unified data management in the mobile core network.

The network procedure 1000 begins as the UE 205 attaches to a 5G network and is registered over a PDU session used for IMS signaling (e.g., the first PDU session 910) via the default 5G network slice (e.g., the first network slice instance 920) to an IMS network (see block 1015). In certain embodiments, the application server (e.g., of the AS/DM server 1005) indicates to the 5GS NF 1010 that the media of an IMS service is to be sent via a different network interface, here a different 5G network slice (see communication 1020). In response, the 5GS NF 1010 sends the mapping of the IMS service to a network interface to the device management server (e.g., of the AS/DM server 1005). Here, the application server may send an IMS service identifier (e.g., mapped to an ICSI) and/or an IARI to denote the IMS service for which the media traffic is to be offloaded to another network slice. Moreover, the network interface may be indicated by an S-NSSAI of the slice, or by a DNN and SSC mode.

In certain embodiments, the application server maintains a mapping between the ICSI and/or an IARI and the IMS service identifier. It may be assumed that the IMS operator and network operator may have pre-agreed on how an external IMS service identifier may map to an ICSI and/or IARI. This may be based on a service layer agreement (SLA).

In some embodiments, the AS/DM server 1005 may configure the UE 205 with selection policy rules, so that the media of an IMS service may be routed via a certain network interface, e.g., a 5G network slice identified by an S-NSSAI (see communication 1025). The AS/DM server 1005 may also provide a mapping of the ICSI and/or IARI to network interface (e.g. S-NSSAI) for the media flows. Alternatively, the AS/DM server 1005 may indicate in the ICSI that the media of this session is to be sent via a different network interface. Moreover, the AS/DM server 1005 may also provide a mapping of the external IMS service identifier to ICSI and/or IARI. In some embodiments, 5GS NF 1010 provides updated URSP rules to the UE 205, which may be based on the AS information (see communication 1030). The URSP rules may include a rule for the IMS service based on the IMS service identifier or the media type of the IMS session.

At some point an application in the UE 205 may request an IMS service (see request 1035). In certain embodiments, the application provides an application identifier and media type information for the requested IMS service. In response to the request, the UE 205 determines which network slice should carry the media traffic for the media type of the IMS service (see block 1040). To do so, the UE 205 may check the configuration to identify if media traffic is to be sent via a separate 5G network slice (e.g., different than the network slice over which the UE 205 registers with the IMS network).

In various embodiments, the UE 205 may check the URSP rules or the IMS configuration (S-NSSAI to ICSI mapping) to identify if there is a rule based on the media type or IMS service identifier. In the depicted embodiment, it is assumed that the rule indicates that the media is to be sent over the second network slice. Additionally, the UE 205 determines whether there is an existing PDU session that can be used to route the media traffic or whether the UE 205 needs to request a new PDU session, for example requesting an S-NSSAI according to the URSP rule or IMS configuration.

If there is no existing PDU session that can be used to route the media traffic based on the UE policies, the UE 205 requests to establish a new PDU session (see optional communication 1045). Here, the PDU session establishment request may include the S-NSSAI and DNN according to the UE configuration (e.g. based on URSP rules). The IMS client 615 may store the IP address allocated after the PDU session is established. Note that each established PDU session may be associated with a different UE IP address.

After identifying the appropriate network slice and determining the PDU session associated with that network slice (including establishing a new PDU session if needed), the UE 205 may start the IMS service and may construct an SDP offer with source IP address and the address of the PDU session to be used to route the IMS media. For example, a PDU session may be mapped to a particular 5G network slice, may be mapped to a DNN, or may be mapped to an SSC mode. The UE 205 sends a SIP INVITE request to the P-CSCF 154 using the IP address of the PDU session used for IMS signaling (see communication 1050). Here, the SIP INVITE request includes the SDP offer.

The P-CSCF 154 forwards the SIP INVITE request to the S-CSCF 158, which in turn forwards it to the application server (e.g., the AS/DM server 1005, see communications 1055 and 1060). In the depicted embodiment, the AS/DM server 1005 responds to the SIP INVITE request by sending a SIP '200 OK' message, which message is returned to the P-CSCF 154 (see communications 1065 and 1070). In some embodiments, the R-CSCF may reserve resources from the PDU session of the network slice that is to be used for media traffic (see block 1075). In certain embodiments, the P-CSCF identifies that a request of resources is to be sent to a different PCF (e.g., to the second PCF 245 in the second network slice) based on the IP address included in the SDP offer of the SIP INVITE request. Additionally, the P-CSCF forwards the SIP '200 OK' message to the UE 205, indicating that the SIP INVITE request was successful (see communication 1080).

Figure 11:
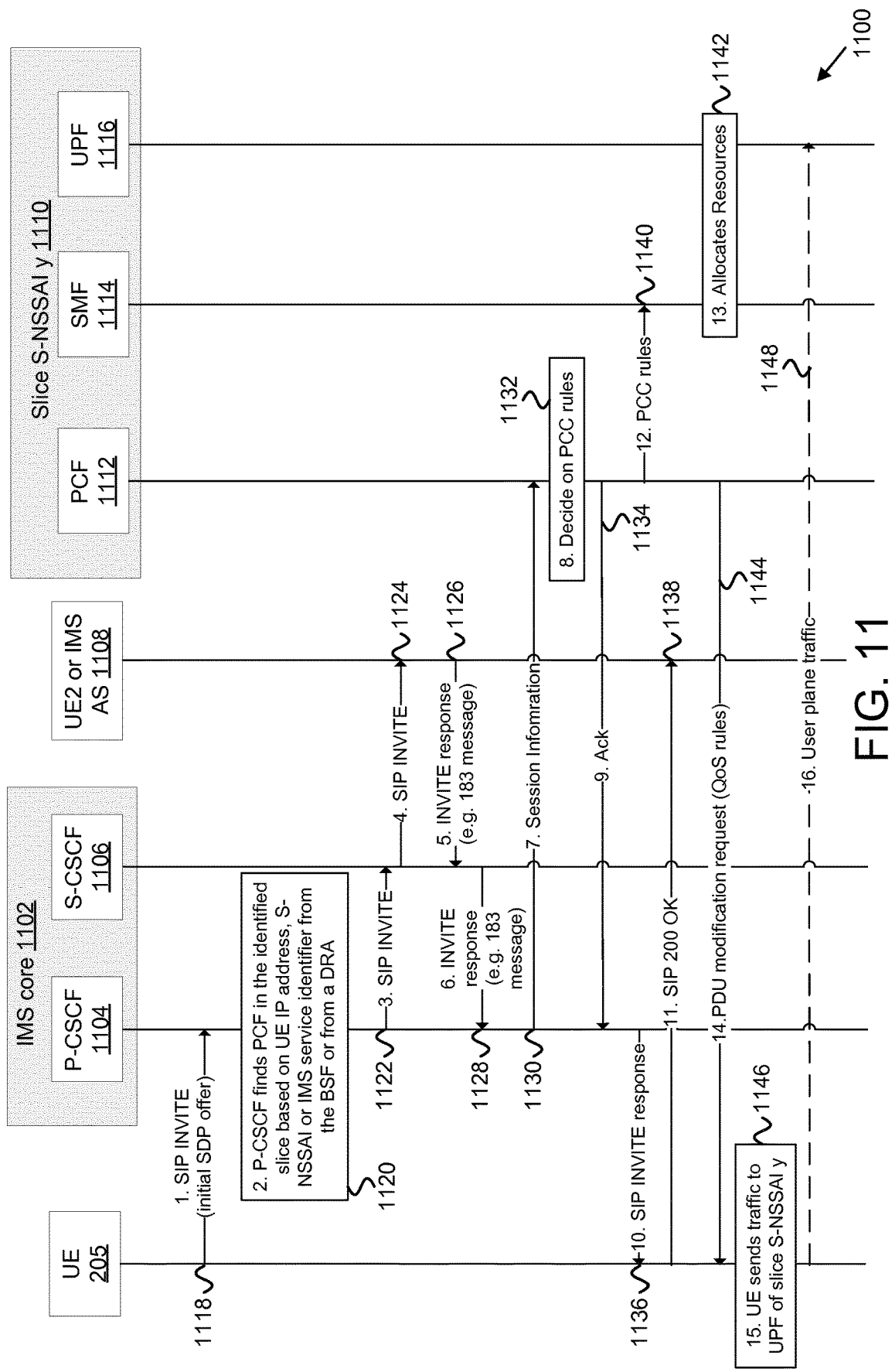
FIG. 11 is a block diagram illustrating one embodiment of a network procedure for selecting a network slice type for media traffic of an IMS session.

FIG. 11 depicts a network procedure 1100 for selecting a network slice type for media traffic of an IMS session, according to embodiments of the disclosure. The network procedure 1100 involves the UE 205, an IMS core 1102, a correspondent node 1108, and a second network slice 1110 (here, the S-NSSAI y). In one embodiment, the correspondent node 1108 is a second UE. In another embodiment, the correspondent node 1108 is an IMS application server. Here, the IMS core 1102 includes a P-CSCF 1104 and a S-CSCF 1106. Additionally, the second network slice 1110 includes a PCF 1112, a SMF 1114, and a UPF 1116.

The network procedure 1100 shows call flow to reserve resources for media by the 5G network slice selected based on the ICSI/IARI configuration. In one embodiment, the network procedure 1100 initiates upon reception at the P-CSCF 1104 of a SIP INVITE message with SDP offer sent by the UE 205, for example as discussed above with reference to FIG. 10. In another embodiment, the network procedure 1100 initiates when the P-CSCF 1104 receives the response to the SIP INVITE.

The network procedure 1100 begins with the UE 205 sending a SIP INVITE request to the P-CSCF 1104 (see communication 1118). Here, the SIP INVITE request includes an initial SDP offer. In various embodiments, the SDP offer includes the UE IP address of the PDU session established by the UE 205 to connect to the identified network interface (a 5G network slice which may be selected based on the ICSI/IARI to S-NSSAI configuration or URSP rules).

In one embodiment the UE 205 constructs the SDP offer by setting a value of the c-line (also referred to as the "c=" line) to the UE-allocated IP address for the PDU session which is to be used to convey the media traffic. Note, that an SDP offer may include multiple value lines, with the c-line field indicating connection information. One example of a SIP message with an SDP offer having the IP address for the PDU session which is to be used to convey the media traffic in the c-line is shown in FIG. 8.

Moreover, the UE 205 may send the SIP INVITE request using the IP address of the PDU session used for IMS signaling. Depending on the UE configuration 905, the IP address of the PDU session used for IMS signaling may be different than the IP address of the PDU session used for media traffic, for example, due to the media traffic having different service requirements than what is supported by the first (e.g., default) network slice. Additionally, the UE 205 may insert the UE-allocated IP address for the PDU session used to transport IMS signaling traffic in the Contact field of the SIP header.

In one embodiment, when the P-CSCF 1104 receives the SIP INVITE request, the P-CSCF 1104 may identify a PCF 1112 in the second network slice (see block 1120). For example, the P-CSCF 1104 may determine the need to select a PCF in the second network slice and send session information towards a PCF selection function (not shown), wherein the PCF selection function selects the PCF 1112 as the appropriate PCF in the second network slice. Note that, in the depicted embodiment, the slice second network is to be used to carry the media traffic. In certain embodiments, the P-CSCF 1104 identifies the second network slice based on an IMS service identifier in the SIP message and/or by mapping the IP address included in the SDP offer to a S-NSSAI. In certain embodiments, the P-CSCF 1104 may use the IP address in the SDP offer to discover the PCF 1112, for example from a Bootstrapping Function ("BSF") of Diameter Routing Agent ("DRA") in the mobile network. In a further embodiment, the P-CSCF 1104 may establish a Diameter session with the selected PCF 1112.

The P-CSCF 1104 then forwards the SIP INVITE request to the intended recipient (e.g. correspondent node 1108, here a target UE or an IMS AS) via the IMS core (see communications 1122 and 1124). The correspondent node 1108 prepares an SIP INVITE response and sends it to the P-CSCF 1104 (see communications 1126 and 1128). In one embodiment, the SIP INVITE response is a SIP '183 Session Progress' message.

Upon receiving the SIP INVITE response (e.g., a SIP '183' message), the P-CSCF 1104 sends the session information to the selected PCF 1112 (see communication 1130). In one example, the session information includes media session information for the source UE 205 (from the SIP INVITE request) and for the target correspondent node 1108 (e.g., from the SIP INVITE response). Using the session information, the PCF 1112 decides on PCC rules for the IMS session (see block 1132). Here, the PCC rules may be based on subscription information of the UE 205. Additionally, the PCF 1112 sends an ACK message confirming establishment of resources (see communication 1134), Upon receiving the resource establishment confirmation, the P-CSCF 1104 sends the SIP INVITE response to the originating UE (see communication 1136). Note that this is the same SIP INVITE response received from the correspondent node 1108, which may be a SIP '183' message. The UE 205, in turn, confirms the IMS session by sending a SIP '200 OK' message to the correspondent node (see communication 1138).

Meanwhile, in parallel with sending the ACK message confirming establishment of resources (refer to communication 1134), the PCF 1112 sends the PCC rules to the SMF 1114 (see communication 1140). In turn, the SMF 1114 identifies the resources required and the SMF 1114 and UPF 1116 allocate the resources for the media traffic of the IMS session. Moreover, the UE 205 receives QoS rules over the applicable PDU session, e.g., from the PCF 1112 (see communication 1144).

In various embodiments, after sending the SIP '200 OK' message, the UE 205 begins sending media traffic via the appropriate QoS flow on the PDU session selected based on the QoS rules received. Here, the UE 205 sends the media traffic to the UPF 1116, it being the UPF of the network slice used for the media traffic (see block 1146 and communication 1148).

Figure 12:
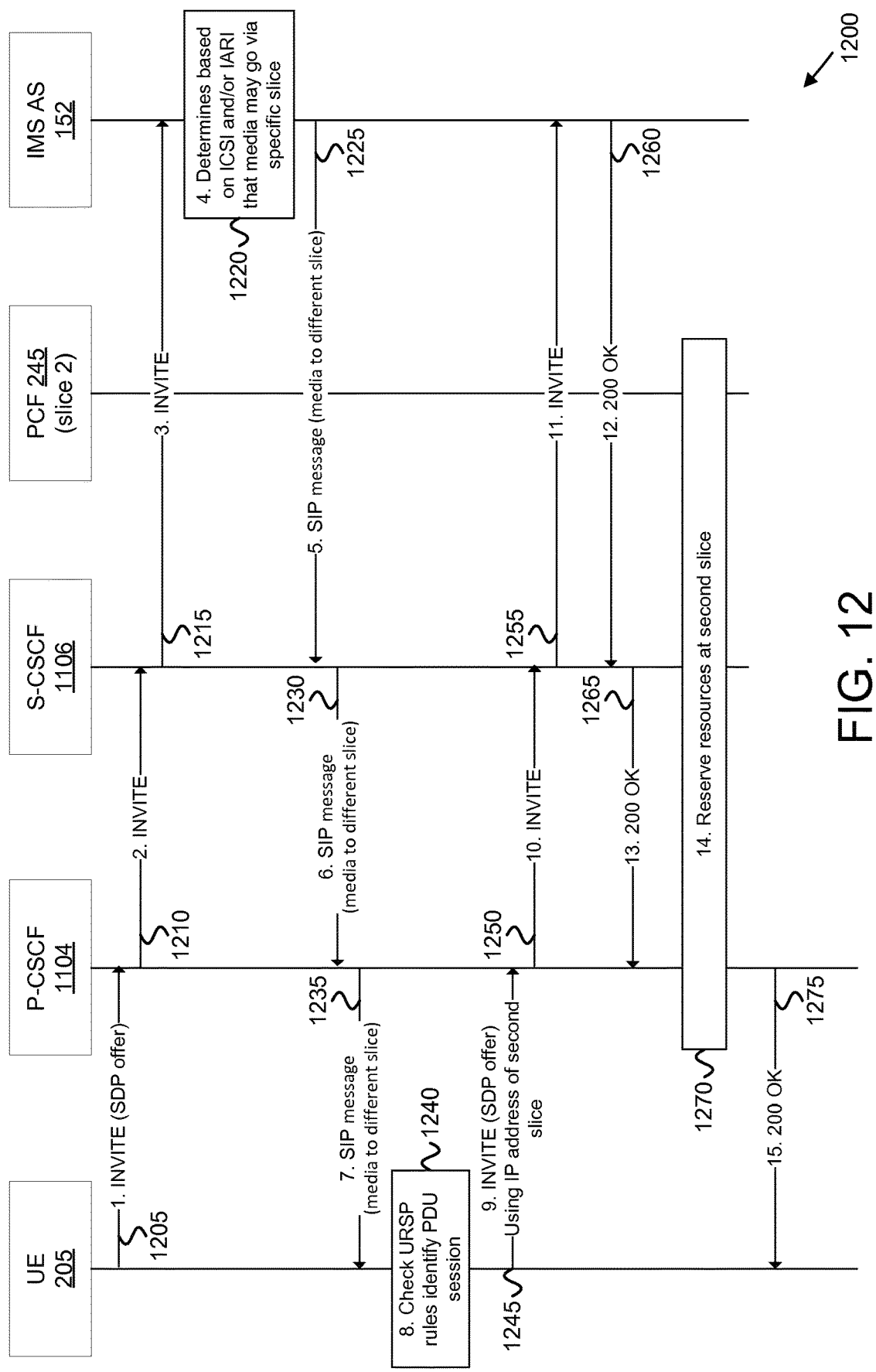
FIG. 12 is a block diagram illustrating one embodiment of a network procedure for selecting a network slice type for media traffic of an IMS session.

FIG. 12 depicts a network procedure 1200 for selecting a network slice type for media traffic of an IMS session, according to embodiments of the disclosure. The network procedure 1200 involves the UE 205, the P-CSCF 1104, the S-CSCF 1106, the IMS AS 152, and the PCF 245 located in the second network slice.

In various embodiments, the IMS AS 152 determines whether an IMS service is to use a different network interface (which may be the 5G network slice) than that used for the IMS signaling and indicates this to the UE 205. Such an indication may be done by signaling to the UE 205 that the media flows for the IMS service are to be routed via a different network interface. In certain embodiments, the indication uses the SIP specific event notification framework (e.g., as defined in RFC 6665) within SIP OPTIONS. In further embodiments, an additional notification event may be used to indicate to the UE 205 that media traffic of certain types is to be sent via a second network slice (e.g., the different network interface).

The IMS client (e.g., the IMS client 615 of the UE 205), may check the URSP rules on receiving SIP OPTIONS, to determine if there is an existing PDU session for conveying the media traffic or if a new PDU session to a specific network interface needs to be established to convey the media traffic. As discussed above, the UE 205 may include the IP address of the second network interface (e.g., second network slice) to convey the media in the SDP offer.

In one embodiment, the IMS AS 152 may indicate that media traffic for an IMS service is to use a different network interface by sending a SIP '4xx Failure' response. The IMS client 615 on receiving SIP '4xx Failure' response may then check the URSP rules to determine if there is an existing PDU session to carry the media traffic or if a new PDU session to a specific network interface needs to be established to route the media traffic. Again, the UE 205 may include the IP address of the second network interface (e.g., second network slice) to convey the media in the SDP offer.

In another embodiment, the IMS AS 152 may indicate that media traffic for an IMS service is to use a different network interface by sending a SIP '3xx Redirection' response. The IMS client 615 on receiving SIP '3xx Redirection' response may then check the URSP rules to determine if there is an existing PDU session to carry the media traffic or if a new PDU session to a specific network interface needs to be established to route the media traffic. Here, the UE 205 may include the IP address of the second network interface (e.g., second network slice) to convey the media in the SDP offer.

The procedure 1200 begins with the UE 205 (e.g., being attached on a first network slice) sending a SIP INVITE request to the P-CSCF 1104 (see communication 1205). Here, the SIP INVITE request includes an ICSI and/or IARI of the requested IMS service and an SDP offer. The SDP offer may include a media type and the IP address of the PDU session which is to be used for the media traffic. Note that initially, the UE 205 populates the SDP offer with the IP address of the first PDU session (associated with the default network slice), as the UE 205 is not aware whether media redirection will be required. The P-CSCF 1104 sends the SIP INVITE request to the S-CSCF 1106, which in turn sends the SIP INVITE request to the IMS AS 152 (see communications 1210 and 1215).

Upon receiving the SIP INVITE request, the IMS AS 152 determines whether the media traffic for the requested session needs to the sent via a different network slice (e.g., different than the one used to send the SIP INVITE). In certain embodiments, the IMS AS 152 may base the determination on the ICSI and/or IARI included the SIP INVITE request. In certain embodiments, the IMS AS 152 may base the determination on the media type included in the SDP offer. Moreover, in some embodiments, the IMS AS 152 uses both the media type and the ICSI/IARI to determine whether a different network slice is needed to carry the media traffic for the requested session. In the depicted embodiment, it is assumed that the IMS AS 152 determines that the media traffic for the requested IMS session is to be offloaded to a second network slice associated with the PCF 245 (see block 1220).

Having determined that the media traffic is to be sent via a different network slice, the IMS AS 152 sends a SIP message (e.g., a SIP message request) to the P-CSCF 1104 (via the S-CSCF 1106), the SIP message containing an indication that media traffic is to be offloaded to a different slice (see communications 1225 and 1230). In one embodiment, the indication may be a new IMS feature tag indicating media redirection (e.g., the tag '<feature=media redirection>'). The P-CSCF 1104 passes the SIP message to the UE 205 (see communication 1235)

Upon receiving the SIP message indicating that media traffic for the IMS session is to use a different network slice (e.g., a SIP message with "media redirection" feature tags), the IMS client in the UE 205 may determine that the media traffic cannot be sent via the first network slice. Accordingly, the UE 205 may check the URSP policies to identify an established the PDU session to send the IMS media or identify the need to establish a new PDU session for that task (see block 1240).

Next, the UE 205 sends a new SIP INVITE request to the P-CSCF 1104 (see communication 1245). Here, the new SIP INVITE request includes a new SDP offer that indicates the second network slice is to be used to route the media traffic. The new SDP offer may be similar to the initial SDP offer, but having the IP address assigned to the PDU session associated with the second network slice in the c-line, rather than the IP address of the PDU session associated with the first network slice. Note, however, that the UE 205 may send the new SIP INVITE request using the IP address of the PDU session used for IMS signaling, here the IP address of the PDU session associated with the first network slice. The P-CSCF 1104 sends the new SIP INVITE request to the S-CSCF 1106, which in turn sends the SIP INVITE request to the IMS AS 152 (see communications 1250 and 1255).

Because the SIP INVITE request includes an IP address associated with the appropriate network slice, the IMS AS 152 accepts and indicates a successful response, here sending a SIP '200 OK' message to the S-CSCF 1106, which passes the SIP '200 OK' message on to the P-CSCF 1104 (see communications 1260 and 1265).

Upon receiving the SIP '200 OK' message, the P-CSCF 1104 may request, e.g., via the PCF 245, to reserve resources in the second network slice (see block 1270). Note that the P-CSCF 1104 may identify the PCF 245 based on the IP address in the new SDP offer. The P-CSCF 1104 also sends the SIP '200 OK' message to the UE 205 (see communication 1275).

Figure 13:
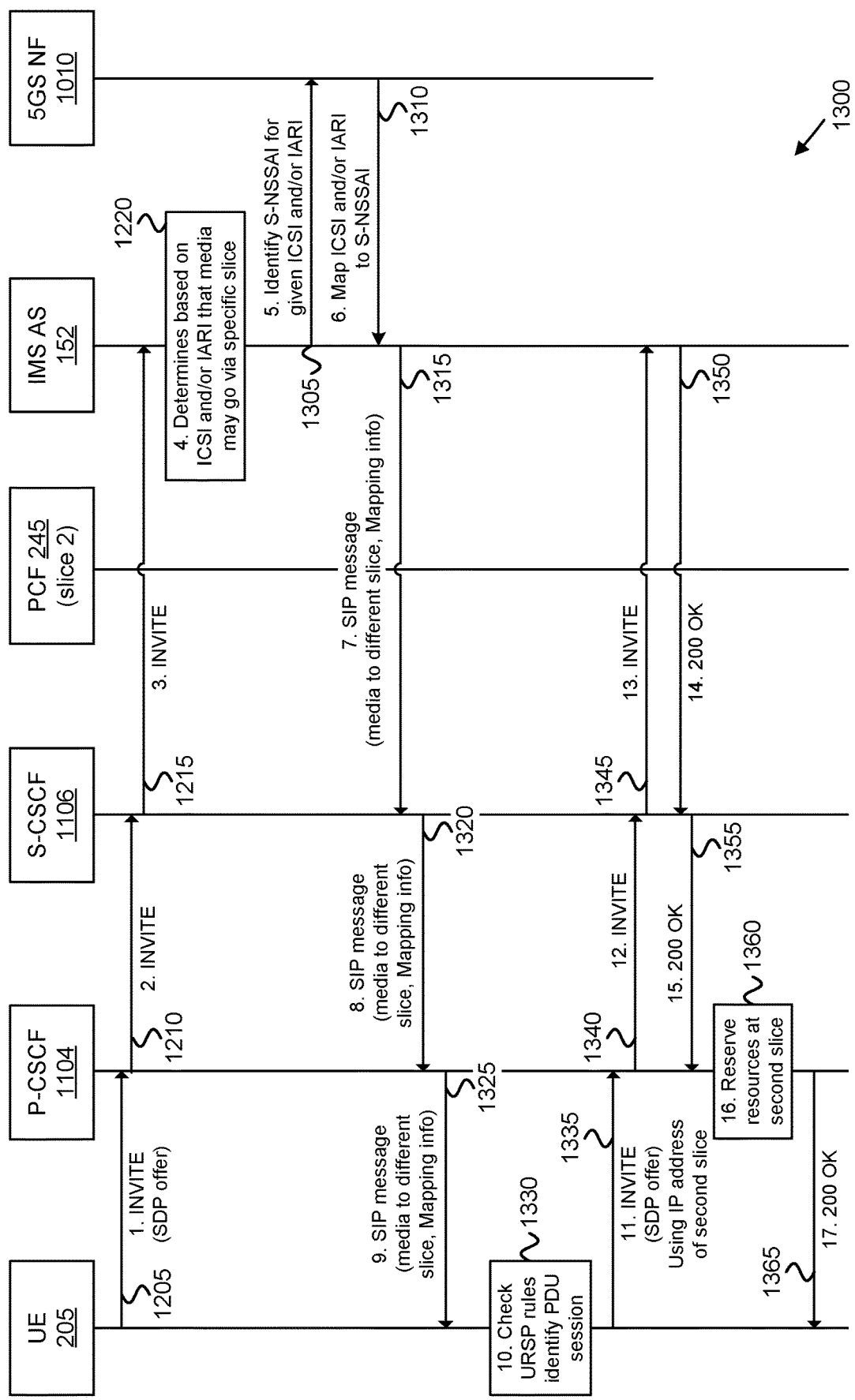
FIG. 13 is a block diagram illustrating one embodiment of a network procedure for selecting a network slice type for media traffic of an IMS session.

FIG. 13 depicts a network procedure 1300 for selecting a network slice type for media traffic of an IMS session, according to embodiments of the disclosure. The network procedure 1300 involves the UE 205, the P-CSCF 1104, the S-CSCF 1106, the IMS AS 152, the 5GS NF 1010, and the PCF 245 located in the second network slice.

In some embodiments, the IMS AS 152 may provide the UE 205 mapping information within SIP signaling. Here, the mapping information assists the UE 205 to determine which media flows are to be sent via specific network slices. Again, the particular network slice may be determined based on the ICSI and/or IARI.

In such embodiments, when the UE 205 starts a media session (e.g., by sending an SIP INVITE request towards the IMS network 150), the IMS AS 152 may indicate to the UE 205 that the media traffic for the requested session is to be sent via a different slice. Moreover, the IMS AS 152 may also provide to the UE 205 assistance information, such as a mapping of ICSI/IARI values to S-NSSAI. The IMS AS 152 receives the mapping information (e.g., using appropriate service based API). from a 5G network function, such as the UDR 149, the PCF 147, or a NSSF. If IMS AS 152 is not trusted by the mobile core network 140, then the assistance information may be routed via a network exposure function ("NEF").

The network procedure 1300 with the UE 205 (e.g., being attached on a first network slice) sending a SIP INVITE request to the P-CSCF 1104 (see communication 1205). Here, the initial SIP INVITE request includes an ICSI and/or IARI of the requested IMS service and an initial SDP offer. The initial SDP offer may include a media type and the IP address of the PDU session which is to be used for the media traffic. Note that initially, the UE 205 populates the SDP offer with the IP address of the first PDU session (associated with the default network slice), as the UE 205 is not aware whether media redirection will be required. The P-CSCF 1104 sends the initial SIP INVITE request to the S-CSCF 1106, which in turn sends the initial SIP INVITE request to the IMS AS 152 (see communications 1210 and 1215).

Upon receiving the initial SIP INVITE request, the IMS AS 152 determines whether the media traffic for the requested session needs to the sent via a different network slice (e.g., different than the one used to send the initial SIP INVITE). In certain embodiments, the IMS AS 152 may base the determination on the ICSI and/or IARI included the initial SIP INVITE request. In certain embodiments, the IMS AS 152 may base the determination on the media type included in the SDP offer. Moreover, in some embodiments, the IMS AS 152 uses both the media type and the ICSI/IARI to determine whether a different network slice is needed to carry the media traffic for the requested session. In the depicted embodiment, it is assumed that the IMS AS 152 determines that the media traffic for the requested IMS session is to be offloaded to a second network slice associated with the PCF 245 (see block 1220).

Additionally, the IMS AS 152 may interface with the 5GS NF 1010 to determine the appropriate network slice for the media flows (see communications 1305 and 1310). Here, the IMS AS 152 may provide the ICSI and/or IARI included the initial SIP INVITE request and the 5GS NF 1010 may return mapping information that associates a network slice identifier, such as the S-NSSAI, with the ICSI and/or IARI. In various embodiments, the 5GS NF 1010 may be the NSSF, PCF 230 or UDR/UDM.

Having determined that the media traffic is to be sent via a different network slice, the IMS AS 152 sends a SIP message to the P-CSCF 1104 (via the S-CSCF 1106), the SIP message containing an indication that media traffic for the requested session is to be offloaded to a different slice (see communications 1315 and 1320). In one embodiment, the indication may be a new IMS feature tag indicating media redirection (e.g., the tag '<feature=media redirection >'). Additionally, the SIP message may include the mapping information received from the 5GS NF 1010. The P-CSCF 1104 passes the SIP message to the UE 205 (see communication 1325).

Upon receiving the SIP message indicating that media traffic for the IMS session is to use a different network slice (e.g., a SIP message with "media redirection" feature tags) and the mapping information (e.g., the ICSI/IARI to S-NSSAI mapping), the IMS client in the UE 205 may determine that the media traffic cannot be sent via the first network slice. Accordingly, the UE 205 may check the URSP policies to identify an established the PDU session over the mapped S-NSSAI or identify the need to establish a new PDU session for that task (see block 1330).

Next, the UE 205 sends a new SIP INVITE request to the P-CSCF 1104 (see communication 1335). Here, the new SIP INVITE request includes a new SDP offer that indicates the second network slice is to be used to route the media traffic. The new SDP offer may be similar to the initial SDP offer, but having the IP address assigned to the PDU session associated with the second network slice in the c-line, rather than the IP address of the PDU session associated with the first network slice. Note, however, that the UE 205 may send the new SIP INVITE request using the IP address of the PDU session used for IMS signaling, here the IP address of the PDU session associated with the first network slice. The P-CSCF 1104 sends the new SIP INVITE request to the S-CSCF 1106, which in turn sends the SIP INVITE request to the IMS AS 152 (see communications 1340 and 1345).

Because the SIP INVITE request includes an IP address associated with the appropriate network slice, the IMS AS 152 accepts and indicates a successful response, here sending a SIP '200 OK' message to the S-CSCF 1106, which passes the SIP '200 OK' message on to the P-CSCF 1104 (see communications 1350 and 1355).

Upon receiving the SIP '200 OK' message, the P-CSCF 1104 may request, e.g., via the PCF 245, to reserve resources in the second network slice (see block 1360). Note that the P-CSCF 1104 may identify the PCF 245 based on the IP address in the new SDP offer. The P-CSCF 1104 also sends the SIP '200 OK' message to the UE 205 (see communication 1365).

In FIG. 6-13 it was assumed that a UE sends all IMS signaling over a single (e.g., default) network slice and selects a network slice for routing the IMS media traffic, e.g., using selection information such as NSSP rules and/or URSP rules. However, in the embodiments of FIG. 14-17, the UE may register multiple PDU sessions with the IMS network, wherein IMS signaling for an IMS session is carried over the same network slice as the media traffic for that session.

Disclosed herein are device and procedures allowing IMS registrations via multiple 5G network slices and selection of an appropriate 5G network slice for routing traffic of an IMS session. Here, the UE 205 establishes multiple PDU sessions, where each PDU session maps to a different 5G network slice. Additionally, the UE 205 selects which PDU session to send IMS signaling traffic for an IMS service based on the IMS application requirements. In one embodiment, the UE 205 selects the PDU session to send IMS signaling based on the media type of the application. In another embodiment, the UE 205 uses the IMS Service Identifier (ICSI and/or IARI) to select a 5G network slice.

Figure 14:
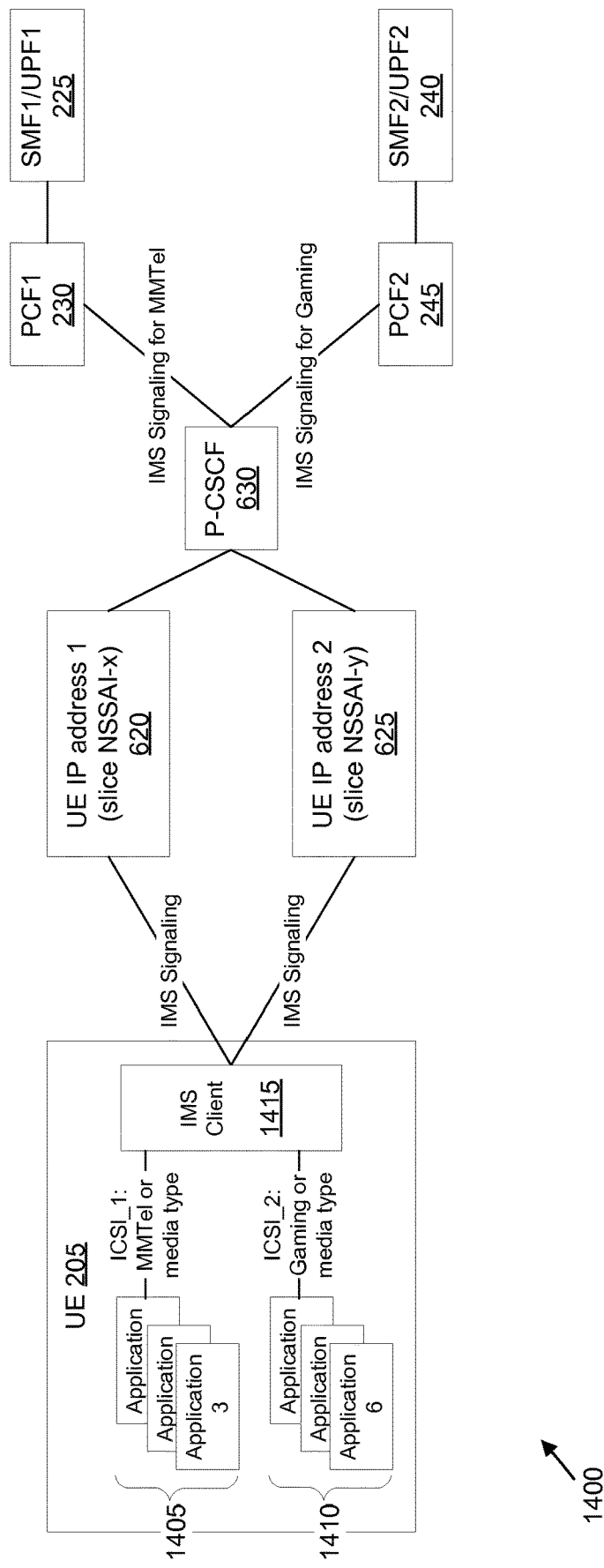
FIG. 14 is a block diagram illustrating one embodiment of a network architecture for selecting a network slice type for media traffic of an IMS session.

FIG. 14 depicts a network architecture 1400 for selecting a network slice type for media traffic of an IMS session, according to embodiments of the disclosure. The network architecture 1400 includes the UE 205 having established a first PDU session with the P-CSCF 630 associated with the first UE IP address 620 and also having established a second PDU session with the P-CSCF 630 associated with the second UE IP address 625.

Here, the UE 205 includes a first set of applications 1405 corresponding to a first IMS media type (here, "MMTel" which is mapped to ICSI_1) and a second set of applications 1410 corresponding to a second IMS media type (here, "Gaming" which is mapped to ICSI_2). Each IMS service may use an ICSI and/or IARI. Conventionally, the ICSI and/or IARI may be used to route the service signaling to the correct application server, identify a proper terminal and address a proper application inside the terminal. However, the ICSI/IARI is used herein to identify a media type for the IMS session (e.g., based on the application) and mapping information is used to select an appropriate network slice using the ICSI/IARI.

An IMS client 1415 at the UE 204 is used to select the appropriate network slice for IMS traffic. In one embodiment a 5G Network Function (e.g. the first PCF 230 and/or second PCF 245) may configure the UE 205 with updated URSP policies, where the traffic descriptor within the URSP policy indicates to the UE 205 where IMS signaling for an application (including the SIP INVITE request) is to be sent, e.g., based on a specific media type or specific IMS Service Identifier. In one embodiment an application server (e.g., the IMS AS 152, not shown) may configure the UE 205 with mapping information indicating which network instance to use (e.g. which 5G network slice) based on the media type of the IMS service requested by an application. In another alternative, the IMS AS 152 may configure the UE based on the ICSI/IARI of the IMS service.

The IMS AS 152 may configure the UE 205 with ICSI to network interface (e.g., ICSI to S-NSSAI) mapping information. For example, the URN of the service may be constructed as follows: urn:3gpp-service.ims.icsi.mmtel.snssai.embb, which URN indicates to the IMS client 1415 that for service 'mmtel' the media must be routed over the 5G network slice 'embb'. The IMS AS 152 may also configure additional parameters, such as the DNN or the SSC mode required for this service. In another alternative the IMS AS 152 may configure the UE 205 that for a specific IMS service, e.g., identified by an ICSI and/or IARI, the IMS Client 1415 is to check the PDU session network configuration (e.g., URSP rules) to identify the PDU session to send IMS signaling traffic.

As depicted, the UE 205 routes IMS signaling (and media traffic) for the first IMS service type (e.g., corresponding to the first set of applications 1405) via the first network slice (e.g., associated with the first UE IP address 620). Also, the UE 205 routes IMS signaling (and media traffic) for the second IMS service type (e.g., corresponding to the second set of applications 1410) via the second network slice (e.g., associated with the second UE IP address 625).

Figure 15:
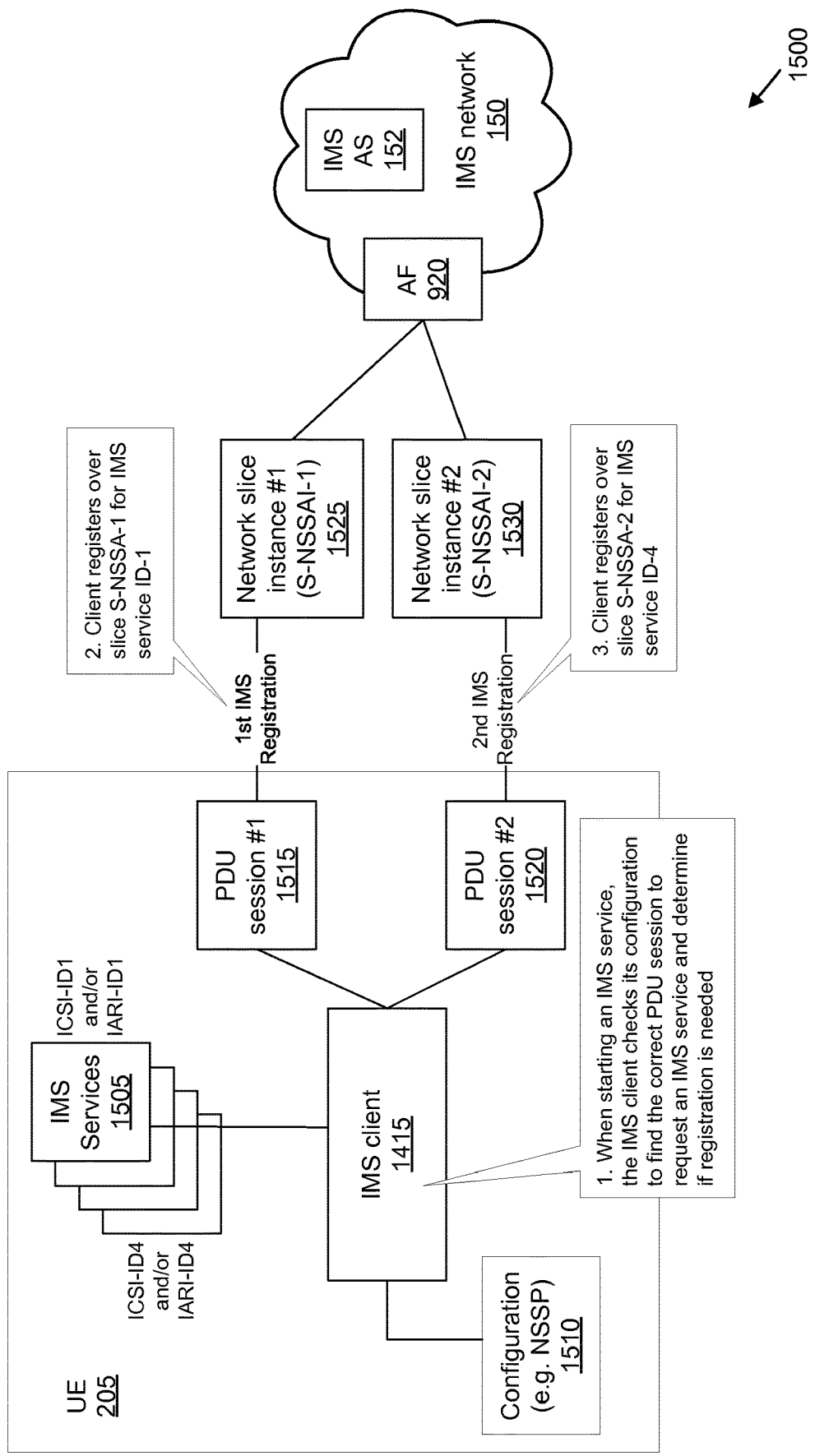
FIG. 15 is a block diagram illustrating one embodiment of a network architecture and related procedure for selecting a network slice type for media traffic of an IMS session.

FIG. 15 depicts a network architecture 1500 for selecting a network slice type for media traffic of an IMS session, according to embodiments of the disclosure. The network architecture 1500 includes a UE 205 that contains an IMS client 1415 which supports a plurality of IMS services 1505. Here, each IMS service 1505 may be associated with an ICSI and/or an IARI. Moreover, the UE 205 is configured with the UE configuration 1510, which may include a set of NSSP rules. In the depicted example, the UE 205 has established a first PDU session 1515 via a first network slice instance 1525 and also established a second PDU session 1520 via a second network slice instance 1530.

Based on the UE configuration 1510, when an application requests to initiate an IMS service 1505, the IMS client 1415 checks the UE configuration 1510 (e.g., URSP rules or IMS configuration) to identify via which 5G network slice to send the IMS signaling to initiate the IMS service. Here, the UE 205 uses the UE configuration 1510 (e.g. URSP rules) to select a PDU session to send the IMS signaling. Moreover, if a new PDU session is required, then the UE 205 requests to establish a PDU session over the specific S-NSSAI indicated by the UE configuration 1510. After the new PDU session is established, the UE 205 performs an additional IMS registration via the new slice. In such embodiments, a S-CSCF 158 in the IMS network determines that the UE 205 has already registered via a different slice and is assigned a new (different) GRUU to the UE 205.

Figure 16:
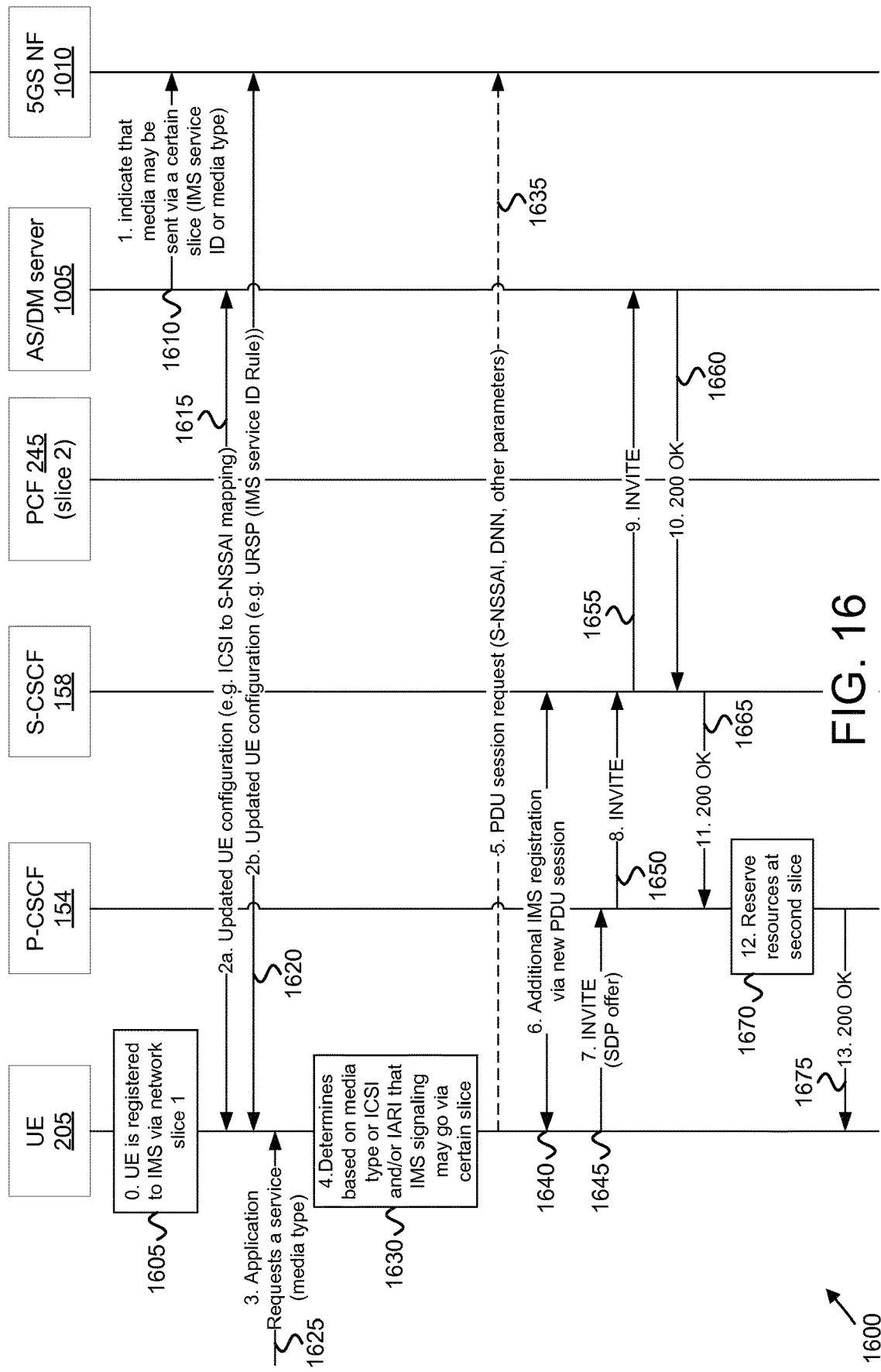
FIG. 16 is a block diagram illustrating one embodiment of a network procedure for selecting a network slice type for media traffic of an IMS session.

FIG. 16 depicts a network procedure 1600 for selecting a network slice type for media traffic of an IMS session, according to embodiments of the disclosure. The network procedure 1600 may be performed by one or more elements in the network architecture 1500. As depicted, the network procedure 1600 involves the UE 205, the P-CSCF 154, the S-CSCF 158, the PCF 245 (e.g., located in a second network slice), the AS/DM server 1005, and the 5GS NF 1010.

The network procedure 1600 begins with the UE 205 (being attached to a 5G network) registering to an IMS network (e.g., the IMS network 150). Here, the UE 205 registers over a PDU session (e.g., the first PDU session 1515) used for IMS signaling via a default 5G network slice (e.g., the first network slice instance 1525).

In various embodiments, the application server in the AS/DM server 1005 may indicate to the 5GS NF 1010 that the media of an IMS service 1505 is to be routed via a different network interface (e.g., via a different 5G network slice) than that used to receive the IMS service request. In some embodiments, the application server uses an IMS service identifier (e.g., an ICSI and/or an IARI) to denote the IMS service 1505. Moreover, the application server may maintain a mapping between the ICSI and/or IARI and the IMS service identifier.

In certain embodiments, the device management in the AS/DM server 1005 obtains, from the 5GS NF 1010, the mapping of the IMS service to a network interface (e.g., network slice instance) which may be identified using an S-NSSAI of the slice, or a combination of DNN and SSC mode. It may be assumed that the IMS operator and network operator may have pre-agreed on how an external IMS service identifier may map to an ICSI and/or IARI. For example, the mapping may be based on service layer agreement ("SLA").

In some embodiments, the AS/DM server 1005 may configure the UE 205 with selection policy rules, so that the traffic of an IMS service 1505 may be routed via a certain network interface, e.g., a 5G network slice identified by an S-NSSAI (see communication 1615). The AS/DM server 1005 may also provide a mapping of the ICSI and/or IARI to network interface (e.g. S-NSSAI) for the media flows. Alternatively, the AS/DM server 1005 may indicate in the ICSI that the media of this session is to be sent via a different network interface. Moreover, the AS/DM server 1005 may also provide a mapping of the external IMS service identifier to ICSI and/or IARI. In some embodiments, 5GS NF 1010 provides updated URSP rules to the UE 205, which may be based on the AS information (see communication 1620). The URSP rules may include a rule for the IMS service based on the IMS service identifier or the media type of the IMS session.

At some point an application in the UE 205 may request an IMS service 1505 (see request 1625). In certain embodiments, the application provides an application identifier and media type information for the requested IMS service 1505. In response to the request, the UE 205 checks the UE configuration 1510 to determine which network slice should carry the media traffic for the media type of the IMS service (see block 1630). Accordingly, the UE 205 determines whether traffic for the IMS service 1505 is to be sent via a separate 5G network slice (e.g., different than the network slice over which the UE 205 registers with the IMS network).

In various embodiments, the UE 205 may check the URSP rules or the IMS configuration (e.g., S-NSSAI to ICSI mapping) to identify if there is a rule based on the media type or IMS service identifier. In the depicted embodiment, it is assumed that the rule indicates that the traffic for the IMS service 1505 (e.g., both media and signaling traffic) is to be sent over the second network slice 1530. Additionally, the UE 205 determines whether there is an existing PDU session that can be used to route the media traffic or whether the UE 205 needs to request a new PDU session, for example requesting a PDU session with the S-NSSAI identified according to the URSP rule or IMS configuration.

If there is no existing PDU session that can be used to route the IMS traffic based on the S-NSSAI identified by the UE configuration 1510, then the UE 205 requests to establish a new PDU session (see optional communication 1635). Here, the PDU session establishment request may include the S-NSSAI and DNN according to the UE configuration (e.g. based on URSP rules). The IMS client 615 may store the IP address allocated after the PDU session is established. Note that each established PDU session may be associated with a different UE IP address.

After identifying the appropriate network slice and determining the PDU session associated with that network slice (including establishing a new PDU session if needed), the IMS client 1415 in the UE 205 determines whether an additional IMS registration is required (e.g., via the new PDU session). To perform the additional IMS registration, the UE 205 sends a new IMS registration request (see communication 1640). Here, the IMS registration is sent over the determined PDU session, rather than over the already-registered PDU session. The IMS registration request includes the IP address allocated to the PDU session associated with the selected network slice.

Additionally, the UE 205 may start the IMS service 1505 and may construct an SDP offer with source IP address and the address of the PDU session to be used to route the IMS media. For example, a PDU session may be mapped to a particular 5G network slice or may be mapped to a DNN or may be mapped to an SSC mode. The UE 205 sends a SIP INVITE request to the P-CSCF 154 within the second registered PDU session, the SIP INVITE request using the IP address of that PDU session (see communication 1645). Here, the SIP INVITE request includes the SDP offer.

The P-CSCF 154 forwards the SIP INVITE request to the S-CSCF 158, which in turn forwards it to the application server (e.g., the AS/DM server 1005, see communications 1650 and 1655). In the depicted embodiment, the AS/DM server 1005 responds to the SIP INVITE request by sending a SIP '200 OK' message, which message is returned to the P-CSCF 154 (see communications 1660 and 1665). In some embodiments, the R-CSCF may reserve resources from the PDU session of the network slice that is to be used for IMS traffic (see block 1670). In certain embodiments, the P-CSCF identifies that a request of resources is to be sent to a different PCF (e.g., to the second PCF 245 in the second network slice) based on the IP address included in the SDP offer of the SIP INVITE request. Additionally, the P-CSCF forwards the SIP '200 OK' message to the UE 205, indicating that the SIP INVITE request was successful (see communication 1675).

Figure 17:
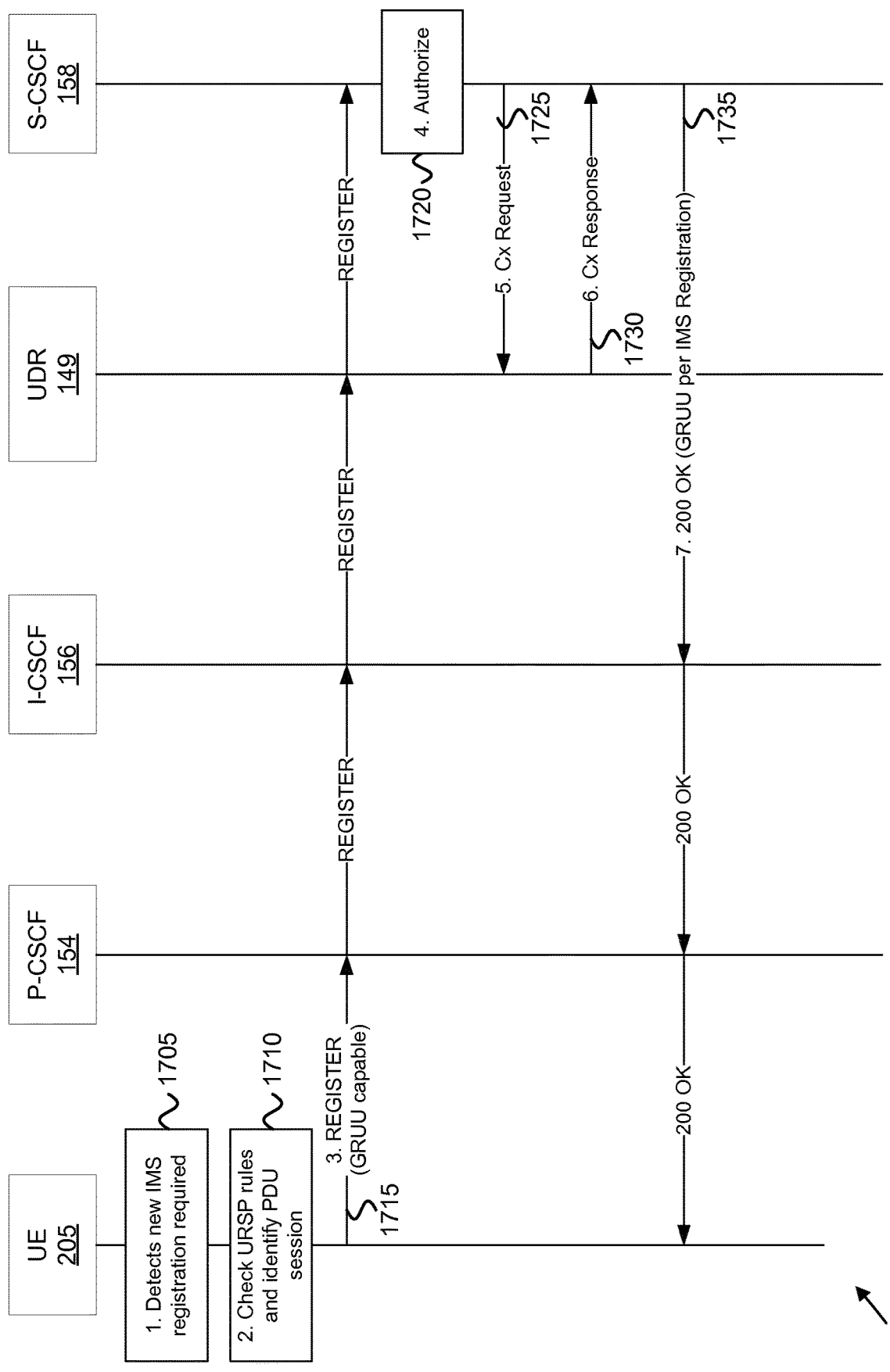
FIG. 17 is a block diagram illustrating one embodiment of a network procedure for registering with an IMS network over multiple network slices.

FIG. 17 depicts a registration procedure 1700 for selecting a network slice type for media traffic of an IMS session, according to embodiments of the disclosure. Here, the registration procedure 1700 involves the UE 205, the P-CSCF 1534, the I-CSCF 156, the UDR 149, and the S-CSCF 158. The UDR 149 is a functional entity that acts as a single logical repository storing user data. The UDR 149 facilitates the sharing and provisioning of user-related data.

When the UE 205 determines that an additional IMS registration may be required (refer to block 1630 and communications 1635 and 1640 of FIG. 16), the UE 205 sends an additional registration request via the unregistered (e.g., new) PDU session. Here, the UE 205 includes in the registration request that it is GRUU (Globally Routable UA URI) capable. The S-CSCF 158 receiving the registration request checks if the UE 205 has a separate registration and, if so, allocates a different GRUU. The IMS client uses the GRUU assigned via each registration request to send media to the appropriate slice. In such embodiments, there is a one-to-one mapping between IMS registration and 5G network slice.

The registration procedure 1700 begins as the IMS client in the UE 205 (e.g., the IMS client 1415) determines that a new IMS registration is required to a different slice, as described above (see block 1705). Next, the IMS client in the UE 205 checks the URSP rules and identifies the PDU session over which to send the IMS registration request (see block 1710).

The UE 205 then performs IMS registration, by sending a SIP REGISTER request (see messaging 1715). In the SIP REGISTER request the UE 205 includes an indication that it is GRUU capable. Note, the UE 205 operates as it carries out a new IMS registration request.

According to IMS registration procedure, the S-CSCF 158 authorizes the UE 205 (see block 1720. The S-CSCF 158 then sends a Cx Request (e.g., over the Cx Interface), for example to acquire subscription and/or profile information of the UE 205, and receives a Cx Response (see messaging 1725 and 1730. Finally, the S-CSCF 158 allocates a new GRUU to the UE 205 responsive to the request. The UE 205 uses the GRUU identities to differentiate between the different IMS registrations.

Figure 18:
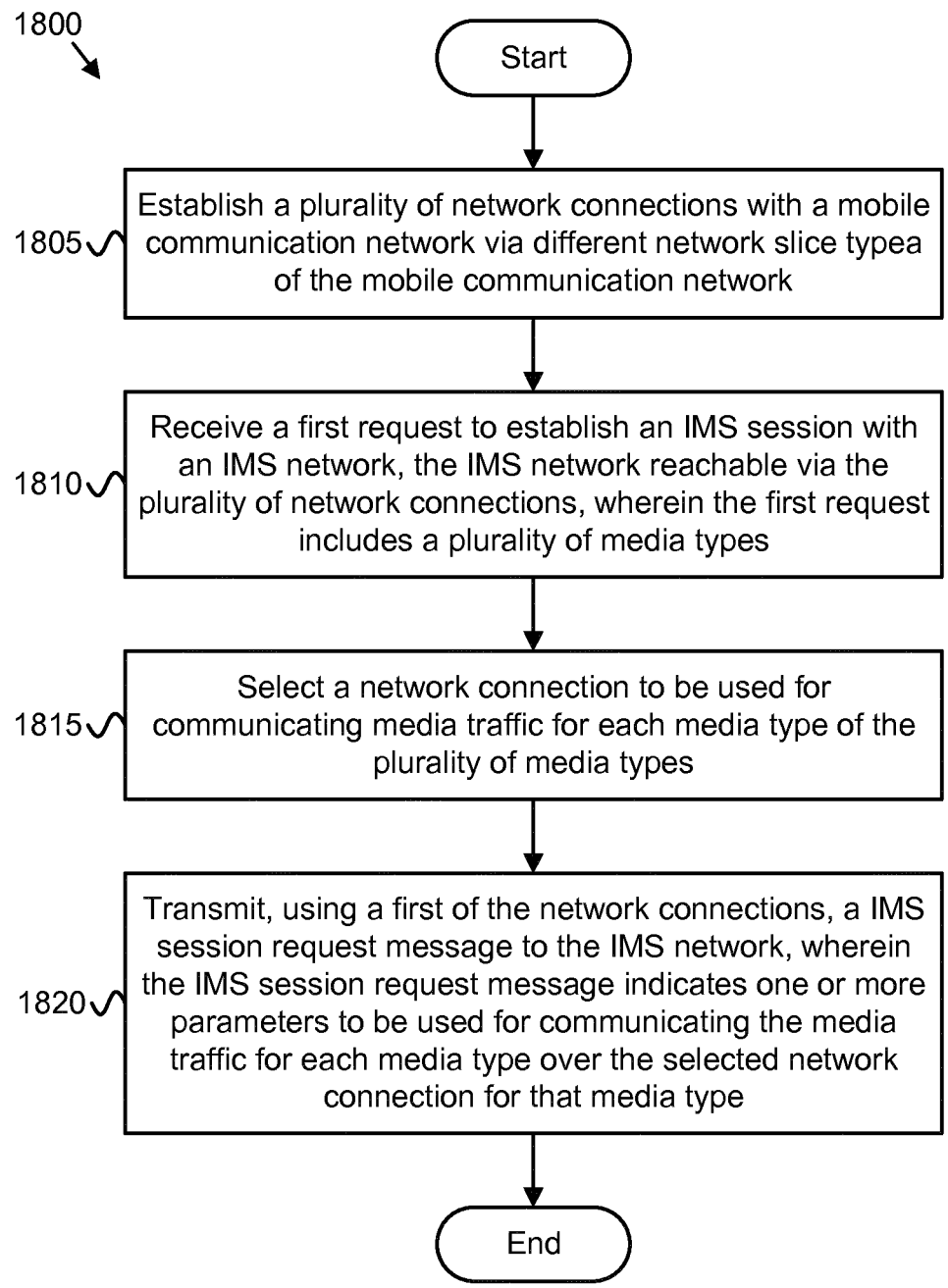
FIG. 18 is a flow chart diagram illustrating one embodiment of a method of a user equipment for selecting a network slice type for media traffic of an IMS session.

FIG. 18 depicts a method 1800 for selecting a network slice type for media traffic of an IMS session, according to embodiments of the disclosure. In some embodiments, the method 1800 is performed by an apparatus, such as the remote unit 105, the UE 205, and/or the user equipment apparatus 300. In certain embodiments, the method 1800 may be performed by a processor executing program code, for example, a microcontroller, a microprocessor, a CPU, a GPU, an auxiliary processing unit, a FPGA, or the like.

The method 1800 begins with establishing 1805, by a remote unit, a plurality of network connections with a mobile communication network. Here, each network connection is established via a different network slice type of the mobile communication network. In some embodiments, the plurality of network connections is plurality of PDU sessions. Here, each PDU session specifies at least one of: a DNN, an SSC mode, and a network slice identifier (e.g., S-NSSAI).

In various embodiments, the method 1800 includes receiving 1810 a first request to establish an IMS session with an IMS network, the IMS network reachable via the plurality of network connections, wherein the first request includes a plurality of media types. In some embodiments, the first request to establish an IMS session is received from application running on the remote unit. In certain embodiments, the remote unit registers with the IMS network via a first of the plurality of network connections prior to receiving 1810 the first request.

In some embodiments, the first request to establish an IMS session requests a certain media type. Here, the remote unit may determine to register with the IMS network via a second of the network connections aced on the requested me to type, where the second network connection is over a network slice that is associated with the request media type.

In various embodiments, the method 1800 includes selecting 1815 a network connection to be used for communicating media traffic for each media type of the plurality of media types. In some embodiments, selecting the network connection includes determining a network slice type for routing media traffic of the requested IMS session using a route selection policy. In one embodiment, the determination is based on the media type of the requested IMS session. In another embodiment, the determination is based on an IMS service indicator of the requested IMS session. Such an IMS service indicator may be an ICSI and/or an IARI. In certain embodiments, the determination is further based on additional information included within IMS signaling.

In some embodiments, selecting 1815 the network connection to be used for communicating media traffic includes determining that a first of the requested media types cannot be transferred in any of the established network connections (e.g., established PDU sessions) and transmitting a request to establish a new network connection (e.g., transmitting a new PDU session establishment request). Here, the request to establish a new network connection indicates a slice type that is associated with the media type that cannot be transferred in any of the established network connections.

In certain embodiments, selecting 1815 the network connection includes registering with the IMS network via a second of the network connection, for example in response to determining that media traffic of at least one media type of the requested IMS session is not to be sent on the first of the network connections. Here, registering with IMS network over the second network connection may include sending an SAP registration request indicating the remote unit is capable of multiple GRUU identities. Note that the remote unit will receive a new GRUU identity for each registration. Thus, the remote unit may be registered with the IMS network via multiple of the network connections, with a different GRUU associated with each network connection over which the remote unit is registered.

In various embodiments, the method 1800 includes transmitting 1820, using the first of the network connections, a IMS session request message to the IMS network, wherein the IMS session request message indicates one or more parameters to be used for communicating the media traffic for each media type over the selected network connection for that media type. In one embodiment, IMS signaling traffic for the requested IMS session uses the first of the network connections, while at least one media type of the requested IMS session is offloaded to a second of the network connections. Here, offloading the media traffic may occur in response to determining that the least one media type of the requested IMS session is not to be sent on the first of the network connections.

In some embodiments, transmitting 1820 the IMS session request message includes transmitting a first SIP INVITE request to the IMS network over the first of the network connections. Here, an SIP response message may be received from IMS network, said SIP response message indicating media redirection to the second of the network connections. In such embodiments, selecting 1815 the network connection includes determining to offload media traffic in response to receiving the SIP response message. Where new PDU session is required (e.g., in response to at least one media type of requested IMS session not being transferable over the established PDU sessions), transmitting 1820 the IMS session request message may further include transmitting a second IMS session request message (e.g., a second SIP INVITE request) after establishing the new PDU session In certain embodiments, the first of the network connections is a PDU session having the IMS network as the DNN. In some embodiments, the IMS session request message as an SIP INVITE request that includes an STP offer. Here, the SDP offer includes an IP address associated with the network connection, with each network connection being allocated a different IP address. In certain embodiments, the SDP offer may include an indication of the requested media type. Where a second SIP INVITE message is required due to at least one media type not being transferable over the first of the network connections, the second SIP INVITE message also includes an SDP offer. Here, the SDP offer includes an indication of the at least one media type and the IP address of the network connection associated with the at least one media type.

Figure 19:
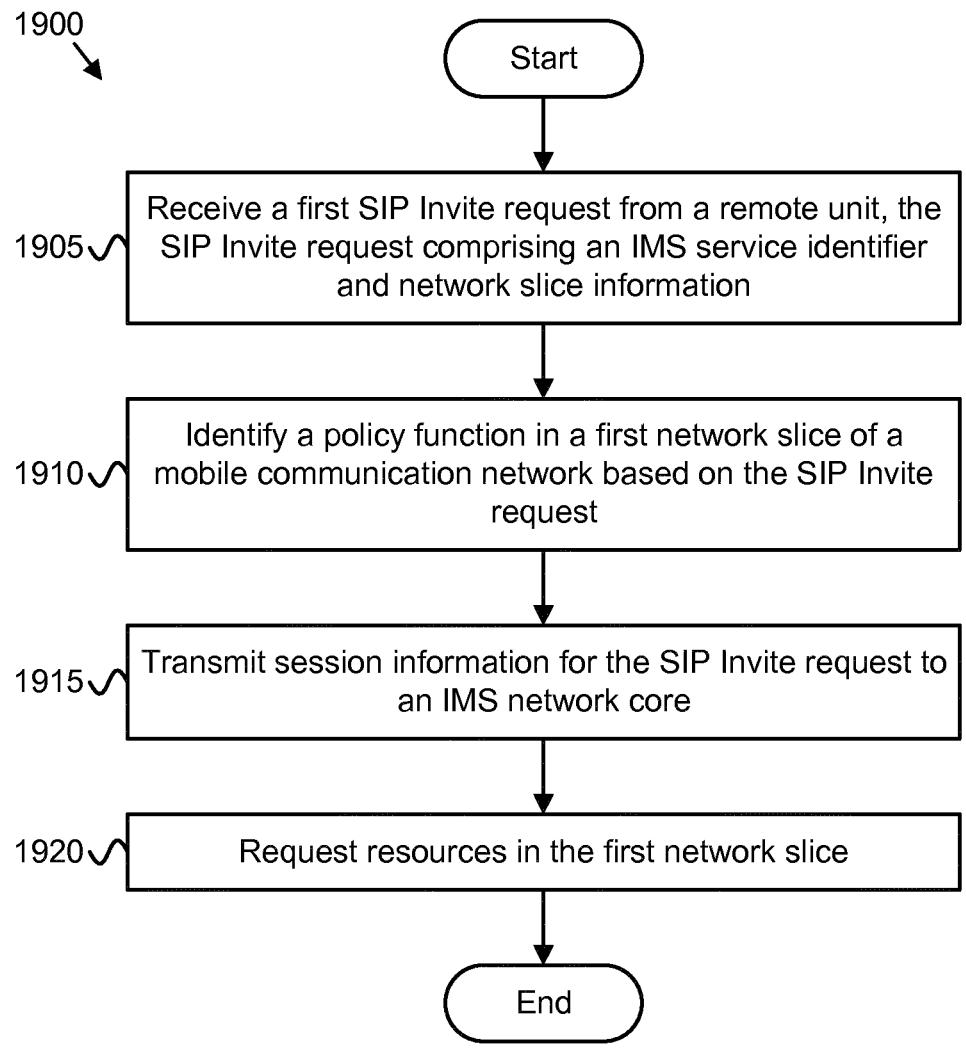
FIG. 19 is a flow chart diagram illustrating one embodiment of a method of a session control function for selecting a network slice type for media traffic of an IMS session.

FIG. 19 depicts a method 1900 for selecting a network slice type for media traffic of an IMS session, according to embodiments of the disclosure. In some embodiments, the method 1900 is performed by an apparatus, such as the P-CSCF 154 and/or the call session control apparatus 400. In certain embodiments, the method 1900 may be performed by a processor executing program code, for example, a microcontroller, a microprocessor, a CPU, a GPU, an auxiliary processing unit, a FPGA, or the like.

The method 1900 begins with receiving 1905 a first SIP INVITE request from a remote unit, the SIP INVITE request comprising an IMS service identifier and network slice information. In certain embodiments, the IMS service identifier is one of an ICSI and an IARI, wherein the network slice information is one or more of: a S-NSSAI, a DNN, and a SSC mode. In various embodiments, the method 1900 includes identifying 1910 a policy function in a first network slice of a mobile communication network based on the SIP INVITE request.

In various embodiments, the method 1900 includes transmitting 1915 session information for the SIP INVITE request to an IMS network core. In one embodiment, transmitting the session information occurs in response to receiving a response to first SIP INVITE request from an IMS application server. In another embodiment, transmitting the session information occurs in response to receiving a first SIP INVITE request (e.g., before receiving the response). In various embodiments, the method 1900 includes requesting 1920 resources in the first network slice. The method 1900 ends.

Figure 20:
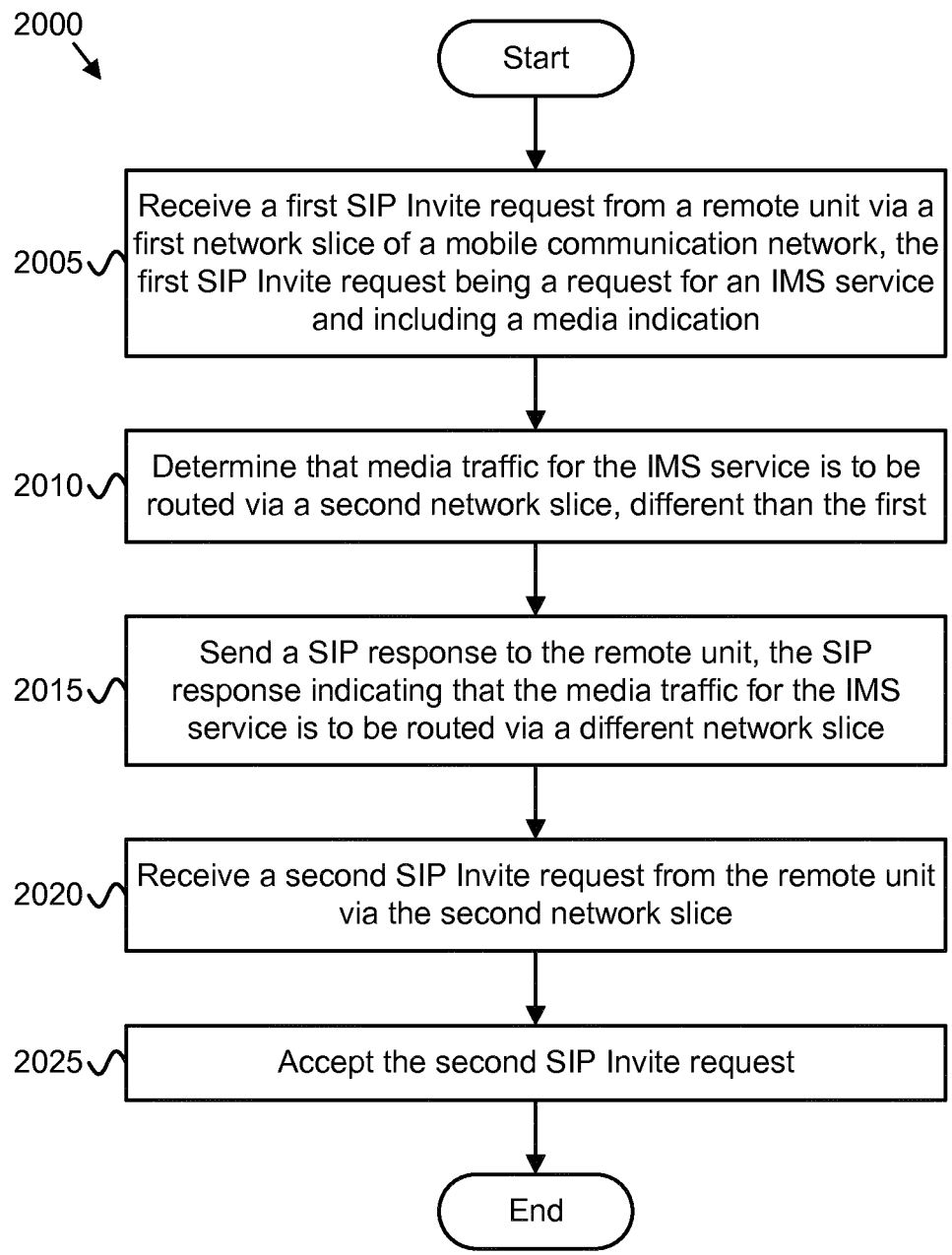
FIG. 20 is a flow chart diagram illustrating one embodiment of a method of an application server for selecting a network slice type for media traffic of an IMS session.

FIG. 20 depicts a method 2000 for selecting a network slice type for media traffic of an IMS session, according to embodiments of the disclosure. In some embodiments, the method 2000 is performed by an apparatus, such as the IMS AS 152 and/or the application server apparatus 500. In certain embodiments, the method 2000 may be performed by a processor executing program code, for example, a microcontroller, a microprocessor, a CPU, a GPU, an auxiliary processing unit, a FPGA, or the like.

The method 2000 begins with receiving a first SIP INVITE request from a remote unit via a first network slice of a mobile communication network. Here, the first SIP INVITE request being a request for an IMS service and including a media indication. In various embodiments, the method 2000 includes determining that media traffic for the IMS service is to be routed via a second network slice, different than the first.

In various embodiments, the method 2000 includes sending a SIP response to the remote unit, the SIP response indicating that the media traffic for the IMS service is to be routed via a different network slice. In some embodiments, sending the SIP response to the remote unit comprises sending one of a SIP failure response and a SIP redirection response, wherein the SIP response indicates that the remote unit is to check routing policy rules to identify the second network slice.

In certain embodiments, sending the SIP response to the remote unit comprises sending assistance information to the remote unit, the assistance information mapping an IMS service identifier to a S-NSSAI of the second network slice, wherein the IMS service identifier is one of an ICSI and an IARI. In one embodiment, the remote unit is configured with routing policy rules, the routing policy rules mapping a specific IMS service identifier to a specific S-NSSAI, wherein the IMS service identifier is one of an ICSI and an IARI.

In various embodiments, the method 2000 includes receiving a second SIP INVITE request from the remote unit via the second network slice. Moreover, the method 2000 includes accepting the second SIP INVITE request. The method 2000 ends.

Disclosed herein is a first apparatus that includes a processor and a transceiver that communicates with a mobile communication network using a plurality of network connections, each network connection communicating via a different network slice type of the mobile communication network. The first apparatus receives a first request to establish an IMS session with an IMS network, the IMS network reachable via the plurality of network connections. Here, the first request includes a plurality of media types. The processor selects a network connection to be used for communicating media traffic for each media type of the plurality of media types. Additionally, the processor controls the transceiver to transmit, using a first of the network connections, a IMS session request message to the IMS network. Here, the IMS session request message indicates one or more parameters to be used for communicating the media traffic for each media type over the selected network connection for that media type. The first apparatus may be a UE and the mobile communication network may be a 3GPP 5G network.

In one or more embodiments of the first apparatus, the first apparatus communicates IMS signaling for the IMS session using the first of the network connections and offloads the media traffic of at least one media type to a second of the network connections. In further embodiments, the first apparatus offloads the media traffic in response to the processor determining that media traffic of the at least one media type of the IMS session is not to be sent on the first of the network connections.

In one or more embodiments of the first apparatus, selecting the network connection to be used for communicating the media traffic for each media type of the plurality of media types includes the processor determining a network slice type for routing media traffic of the IMS session based on the media type of the IMS session using a route selection policy stored at the apparatus. In one embodiment of the first apparatus, the route selection policy maps a specific ICSI to a specific S-NSSAI, the specific S-NSSAI identifying a network slice of the mobile communication network. In another embodiment of the first apparatus, the route selection policy maps a specific media type to a specific S-NSSAI, the specific S-NSSAI identifying a network slice of the mobile communication network.

In one or more embodiments of the first apparatus, selecting the network connection to be used for communicating the media traffic for each media type of the plurality of media types includes the processor determining a network slice type for routing media traffic of the IMS session based on at least one of an ICSI of the IMS session and an IARI of the IMS session. In further embodiments of the first apparatus, the processor also determines a network slice type for routing media traffic of the IMS session based on an additional indication within the IMS signaling.

In one or more embodiments of the first apparatus, the first apparatus transmits the IMS session request message includes sending a first SIP Invite request to the IMS network in response to receiving the first request. In such embodiments, the first apparatus receives a SIP message from the IMS network, the SIP message indicating media redirection to a second of the network connections, wherein the processor determines to offload media traffic for the IMS session to a second of the network connections in response to receiving the SIP message indicating media redirection. In further embodiments of the first apparatus, the first apparatus sends a second SIP Invite request to the IMS network using the first of the network connections in response to receiving the SIP message indicating media redirection.

In one or more embodiments of the first apparatus, the plurality of network connections is a plurality of PDU sessions with the mobile communication network. Here, each PDU session specifies at least one of a DNN, a SSC mode, and a network slice identifier. In one or more embodiments of the first apparatus, a PDU session corresponding to the first of the network connections has the IMS network as the DNN and the first request is received from an application running on the apparatus.

In one or more embodiments of the first apparatus, selecting a network connection to be used for communicating the media traffic for each media type of the plurality of media types includes the processor determining that a first media type from the plurality of media types cannot be transferred in the first of the network connections and determining that the first media type is transferrable over the second of the plurality of network connections. Moreover, the IMS session request may be a SIP INVITE request that comprises an indication that the first media type is to be communicated over the second of the plurality of network connections. In such embodiments, the SIP INVITE request comprises a SDP offer, the SDP offer comprising an indication of the first media type and an IP address of the second network connection, each of the plurality of network connections being allocated a different IP address.

In one or more embodiments of the first apparatus, selecting a network connection to be used for communicating the media traffic for each media type of the plurality of media types includes the processor determining that a first media type from the plurality of media types cannot be transferred in any of the plurality of network connections and transmitting, in response to the first media type not being transferrable in any of the plurality of network connections, a request to establish a new PDU session in the IMS session, said request indicating a network slice type that is associated with the first media type. Moreover, the IMS session request may be a SIP INVITE request that comprises an indication that the first media type is to be communicated over the new PDU session. In such embodiments, the SIP INVITE request comprises a SDP offer, the SDP offer comprising an indication of the first media type and an IP address of the new PDU session, each of the plurality of network connections being allocated a different IP address.

In some embodiments of the first apparatus, the first apparatus registers with the IMS network via the first of the plurality of network connections prior to receiving the first request. Moreover, the plurality of network connections may include a plurality of PDU sessions.

In one or more embodiments of the first apparatus, the processor determines that media traffic of a first media type of the requested plurality of media types is not to be sent on the first of the network connections. In such embodiments, the processor determines a second network connection that supports the first media type and determines whether the second network connection is registered with the IMS network. In one or more embodiments of the first apparatus, transmitting the IMS session request message comprises sending a SIP INVITE request via the second of the network connections.

In one or more embodiments of the first apparatus, the first network connection is a first PDU session of the plurality of PDU sessions and the second network connection is a second PDU session of the plurality of PDU sessions. Here, the processor registers a second time with the IMS network via the second PDU session in response to determining that the second network connection is not registered with the IMS network. Registering with the IMS network via the second PDU session may include sending a SIP REGISTER request that indicates the apparatus is capable of multiple GRUU identities, wherein the apparatus receives a new GRUU identity associated with the second PDU session from the IMS network.

In one or more embodiments of the first apparatus, the processor establishes a new PDU session by sending an establishment request to a network slice associated with the first media type, the second network connection corresponding to the new PDU session, and registers a second time with the IMS network via the new PDU session by sending a SIP REGISTER request that indicates the apparatus is capable of multiple GRUU identities. Here, the apparatus receives a new GRUU identity associated with the new PDU session from the IMS network.

In some embodiments, the first apparatus registers with the IMS network via each of the plurality of network connections each network connection associated with a PDU session over a different network slice. In such embodiments, each of the plurality of network connections is associated with a different GRUU.

Disclosed herein is a second apparatus that includes a processor and a transceiver that communicates with a remote unit via a mobile communication network, the mobile communication network having a plurality of network slices. Here, the second apparatus receives a first SIP INVITE request from a remote unit, the SIP INVITE request including an IMS service identifier and network slice information. The processor identifies a policy function in a first network slice based on the SIP INVITE request. Additionally, the second apparatus transmits session information for the SIP INVITE request to an IMS network and requests resources in the first network slice.

In various embodiments of the second apparatus, the IMS service identifier is one of an ICSI and an IARI, wherein the network slice information is one or more of: a S-NSSAI, a DNN, and a SSC mode. In certain embodiments of the second apparatus, the processor transmits the session information occurs in response to receiving a first SIP INVITE request. In other embodiments of the second apparatus, the processor transmits session information occurs in response to receiving a response to first SIP INVITE request from an IMS application server.

Disclosed herein is a third apparatus that includes a processor and a transceiver that communicates with a remote unit via a mobile communication network, the mobile communication network having a plurality of network slices. The third apparatus receives a first SIP INVITE request from the remote unit via a first network slice. Here, the first SIP INVITE request may be a request for an IMS service and including a media indication. The processor determines that media traffic for the IMS service is to be routed via a second network slice, different than the first. Additionally, the third apparatus may send a SIP response to the remote unit. Here, the SIP response indicating that the media traffic for the IMS service is to be routed via a different network slice. The third apparatus may also receive a second SIP INVITE request from the remote unit via the second network slice and accept the second SIP INVITE request.

In some embodiments of the third apparatus, sending the SIP response to the remote unit includes sending one of a SIP failure response and a SIP redirection response. Here, the SIP response may indicate that the remote unit is to check routing policy rules to identify the second network slice. In certain embodiments of the third apparatus, sending the SIP response to the remote unit includes sending assistance information to the remote unit, the assistance information mapping an IMS service identifier to a S-NSSAI of the second network slice. In further embodiments, the processor may configure the remote unit with routing policy rules, the routing policy rules mapping a specific IMS service identifier to a specific S-NSSAI. In various embodiments of the third method, the IMS service identifier may be one of an ICSI and an IARI.

Disclosed herein is a first method that includes establishing, by a remote unit, a plurality of network connections with a mobile communication network, each network connection communicating via a different network slice type of the mobile communication network. The first method includes receiving a first request to establish an IMS session with an IMS network, the IMS network reachable via the plurality of network connections. Here, the first request includes a plurality of media types. The first method includes a network connection to be used for communicating media traffic for each media type of the plurality of media types. The first method includes transmitting, using a first of the network connections, an IMS session request message to the IMS network. Here, the IMS session request message indicates one or more parameters to be used for communicating the media traffic for each media type over the selected network connection for that media type.

In one or more embodiments of the first method, the remote unit communicates IMS signaling for the IMS session using the first of the network connections and offloads the media traffic of at least one media type to a second of the network connections in response to determining that media traffic of the at least one media type of the IMS session is not to be sent on the first of the network connections.

In one or more embodiments of the first method, selecting the network connection to be used for communicating the media traffic for each media type of the plurality of media types includes determining a network slice type for routing media traffic of the IMS session based on the media type of the IMS session using a route selection policy stored at the apparatus.

In one or more embodiments of the first method, the route selection policy comprises a mapping of a specific S-NSSAI to at least one of: a specific ICSI, a specific IARI, and a specific media type, the specific S-NSSAI identifying a network slice of the mobile communication network.

In one or more embodiments of the first method, selecting the network connection to be used for communicating the media traffic for each media type of the plurality of media types includes determining a network slice type for routing media traffic of the IMS session based on at least one of an ICSI of the IMS session and an IARI of the IMS session.

In one or more embodiments of the first method, the method includes determining a network slice type for routing media traffic of the IMS session based on an additional indication within the IMS signaling.

In one or more embodiments of the first method, transmitting the IMS session request message includes sending a first SIP INVITE request to the IMS network in response to receiving the first request. In such embodiments, the method may include receiving a SIP message from the IMS network, the SIP message indicating media redirection to a second of the network connections and determining to offload media traffic for the IMS session to a second of the network connections in response to receiving the SIP message indicating media redirection.

In one or more embodiments of the first method, the method further includes sending a second SIP INVITE request to the IMS network using the first of the network connections in response to receiving the SIP message indicating media redirection.

In one or more embodiments of the first method, the plurality of network connections includes a plurality of PDU sessions with the mobile communication network, each PDU session specifying at least one of: a DNN, a SSC mode, and a network slice identifier. In such embodiments, selecting a network connection to be used for communicating the media traffic for each media type of the plurality of media types may include: determining that a first media type from the plurality of media types cannot be transferred in the first of the network connections and determining, in response to the first media type being transferrable over a second of the plurality of network connections, that the first media type is transferrable over the second of the plurality of network connections. Here, the IMS session request is a SIP INVITE request that includes an indication that the first media type is to be communicated over the second of the plurality of network connections.

In one or more embodiments of the first method, a PDU session corresponding to the first of the network connections has the IMS network as the DNN and the first request is received from an application running on the apparatus. In such embodiments, the SIP INVITE request may include a SDP offer, the SDP offer including an indication of the first media type and an IP address of the second network connection, each of the plurality of network connections being allocated a different IP address.

In one or more embodiments of the first method, the plurality of network connections is a plurality of PDU sessions with the mobile communication network. Here, each PDU session may specify at least one of a DNN, a SSC mode, and a network slice identifier. In such embodiments, selecting a network connection to be used for communicating the media traffic for each media type of the plurality of media types may include determining that a first media type from the plurality of media types cannot be transferred in any of the plurality of network connections, and transmitting, in response to the first media type not being transferrable in any of the plurality of network connections, a request to establish a new PDU session in the IMS session, the request to establish a new PDU session indicating a network slice type that is associated with the first media type. Here, the IMS session request may be a SIP INVITE request that comprises an indication that the first media type is to be communicated over the new PDU session.

In one or more embodiments of the first method, a PDU session corresponding to the first of the network connections has the IMS network as the DNN. Here, the first request may be received from an application running on the apparatus and the SIP INVITE request comprises a SDP offer, the SDP offer comprising an indication of the first media type and an IP address of the new PDU session, each of the plurality of network connections being allocated a different IP address.

In one or more embodiments of the first method include registering with the IMS network via the first of the plurality of network connections prior to receiving the first request.

In one or more embodiments of the first method include determining that media traffic of a first media type of the requested plurality of media types is not to be sent on the first of the network connections. In such embodiments, the method may include determining a second network connection that supports the first media type and determining whether the second network connection is registered with the IMS network. Here, transmitting the IMS session request message may include sending a SIP INVITE request via the second of the network connections.

In one or more embodiments of the first method, the plurality of network connections comprises a plurality of PDU sessions, the first network connection being a first PDU session of the plurality of PDU sessions and the second network connection being a second PDU session of the plurality of PDU sessions. In such embodiments, the first method may include registering a second time with the IMS network via the second PDU session in response to determining that the second network connection is not registered with the IMS network. Here, registering with the IMS network via the second PDU session may include sending a SIP REGISTER request that indicates the apparatus is capable of multiple GRUU identities, wherein the apparatus receives a new GRUU identity associated with the second PDU session from the IMS network.

In one or more embodiments of the first method, the plurality of network connections comprises a plurality of PDU sessions. In such embodiments, the first method may include establishing a new PDU session by sending an establishment request to a network slice associated with the first media type, where the second network connection corresponds to the new PDU session, and registering a second time with the IMS network via the new PDU session by sending a SIP REGISTER request that indicates the apparatus is capable of multiple GRUU identities. Here, the remote unit receives a new GRUU identity associated with the new PDU session from the IMS network.

In one or more embodiments of the first method, the method includes registering with the IMS network via each of the plurality of network connections each network connection associated with a PDU session over a different network slice, wherein each of the plurality of network connections is associated with a different GRUU.

Disclosed herein is a second method that includes receiving a first SIP INVITE request from a remote unit, the SIP INVITE request including an IMS service identifier and network slice information and identifying a policy function in a first network slice of a mobile communication network based on the SIP INVITE request. The second method also includes transmitting session information for the SIP INVITE request to an IMS network and requesting resources in the first network slice.

In various embodiments of the second method, the IMS service identifier is one of an ICSI and an IARI, wherein the network slice information is one or more of: a S-NSSAI, a DNN, and a SSC mode. In certain embodiments of the second method, transmitting the session information occurs in response to receiving a first SIP INVITE request. In other embodiments of the second method, transmitting the session information occurs in response to receiving a response to first SIP INVITE request from an IMS application server.

Disclosed herein is a third method that includes receiving a first SIP INVITE request from a remote unit via a first network slice of a mobile communication network, the first SIP INVITE request being a request for an IMS service and including a media indication and determining that media traffic for the IMS service is to be routed via a second network slice, different than the first. The third method includes sending a SIP response to the remote unit, the SIP response indicating that the media traffic for the IMS service is to be routed via a different network slice, receiving a second SIP INVITE request from the remote unit via the second network slice, and accepting the second SIP INVITE request.

In some embodiments of the third method, sending the SIP response to the remote unit includes sending one of a SIP failure response and a SIP redirection response. Here, the SIP response indicates that the remote unit is to check routing policy rules to identify the second network slice. In certain embodiments of the third method, sending the SIP response to the remote unit includes sending assistance information to the remote unit. Here, the assistance information maps an IMS service identifier to a S-NSSAI of the second network slice. In some embodiments, the third method also includes configuring the remote unit with routing policy rules. Here, the routing policy rules may map a specific IMS service identifier to a specific S-NSSAI. In various embodiments of the third method, the IMS service identifier may be one of an ICSI and an IARI.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a transceiver that communicates with a mobile communication network using a plurality of network connections, each network connection associated with one of a plurality of protocol data unit ("PDU") sessions over the mobile communication network, where each PDU session is associated to a different network slice type of the mobile communication network; and
a processor that:
receives a configuration for selecting a network slice type for traffic associated with a media type of an internet protocol multimedia subsystem ("IMS") application;
receives a first request to establish an IMS session with an IMS network, the IMS network reachable via the plurality of PDU sessions, wherein the first request comprises a plurality of media types;
selects, for each media type of the plurality of media types, a PDU session to be used for communicating media traffic; and
transmits, using a first of the plurality of PDU sessions, an IMS session request message to the IMS network, wherein the IMS session request message indicates one or more parameters to be used for communicating the media traffic for each media type over the selected PDU session for that media type.

2. The apparatus of claim 1, wherein the processor communicates IMS signaling for the IMS session using the first of the plurality of PDU sessions and offloads the media traffic of at least one media type to a second of the plurality of PDU sessions in response to determining that media traffic of the at least one media type of the IMS session is not to be sent on the first of the plurality of PDU sessions.

3. The apparatus of claim 1, wherein, to select the PDU session to be used for communicating the media traffic for each media type of the plurality of media types, the processor is configured to determine a network slice type for routing media traffic of the IMS session based on the media type of the IMS session using a route selection policy stored at the apparatus.

4. The apparatus of claim 3, wherein the route selection policy comprises a mapping of at least one of:
a specific IMS communication service identifier ("ICSI") or
a specific media type,
to a specific single network slice selection assistance information ("S-NSSAI"), the specific S-NSSAI identifying a network slice of the mobile communication network.

5. The apparatus of claim 1, wherein, to select the PDU session to be used for communicating the media traffic for each media type of the plurality of media types, the processor is configured to determine a network slice type for routing media traffic of the IMS session based on at least one of:
an IMS communication service identifier ("ICSI") or
an IMS application reference identifier ("IARI") of the IMS session.

6. The apparatus of claim 1, wherein the each PDU session specifies at least one of a data network name ("DNN"), a session and service continuity ("SSC") mode, and a network slice identifier, wherein to select the PDU session to be used for communicating the media traffic for each media type of the plurality of media types, the processor is configured to:
determine that a first media type from the plurality of media types cannot be transferred in the first of the plurality of PDU sessions;
determine, in response to the first media type not being transferrable over the first of the plurality of PDU sessions, that the first media type is transferrable over a second of the plurality of PDU sessions,
wherein the IMS session request message is a session initiation protocol ("SIP") INVITE request that comprises an indication that the first media type is to be communicated over the second of the plurality of PDU sessions.

7. The apparatus of claim 6, wherein
a PDU session corresponding to the first of the plurality of PDU sessions has the IMS network as the DNN,
the first request is received from an application running on the apparatus, and
the SIP INVITE request comprises a session description protocol ("SDP") offer, the SDP offer comprising an indication of the first media type and an internet protocol ("IP") address of the second of the plurality of PDU sessions, each of the plurality of PDU sessions being allocated a different IP address.

8. The apparatus of claim 1, wherein each PDU session specifies at least one of a data network name ("DNN") a session and service continuity ("SSC") mode, and a network slice identifier, wherein to select the PDU session to be used for communicating the media traffic for each media type of the plurality of media types, the processor is configured to:
determine that a first media type from the plurality of media types cannot be transferred in any of the plurality of PDU sessions;
transmit, in response to the first media type not being transferrable in any of the plurality of PDU sessions, a second request to establish a new PDU session in the IMS session, the second request indicating a network slice type that is associated with the first media type,
wherein the IMS session request message is a session initiation protocol ("SIP") INVITE request that comprises an indication that the first media type is to be communicated over the new PDU session.

9. The apparatus of claim 8, wherein
a PDU session corresponding to the first of the plurality of PDU sessions has the IMS network as the DNN,
the first request is received from an application running on the apparatus, and
the SIP INVITE request comprises a session description protocol ("SDP") offer, the SDP offer comprising an indication of the first media type and an internet protocol ("IP") address of the new PDU session, each of the plurality of PDU sessions being allocated a different IP address.

10. A method comprising:
establishing, by a remote unit, a plurality of network connections with a mobile communication network, each network connection associated with one of a plurality of protocol data unit ("PDU") sessions over the mobile communication network, where each PDU session is associated to a different network slice type of the mobile communication network;
receiving a configuration for selecting a network slice type for traffic associated with a media type of an internet protocol multimedia subsystem ("IMS") application;
receiving a first request to establish an IMS session with an IMS network, the IMS network reachable via the plurality of PDU sessions, wherein the first request comprises a plurality of media types;
selecting, for each media type of the plurality of media types, a PDU session to be used for communicating media traffic; and
transmitting, using a first of the plurality of PDU sessions, an IMS session request message to the IMS network, wherein the IMS session request message indicates one or more parameters to be used for communicating the media traffic for each media type over the selected PDU session for that media type.

11. The method of claim 10, further comprising:
communicating IMS signaling for the IMS session using the first of the plurality of PDU sessions and
offloading the media traffic of at least one media type to a second of the plurality of PDU sessions in response to determining that media traffic of the at least one media type of the IMS session is not to be sent on the first of the plurality of PDU sessions.

12. The method of claim 10, wherein selecting the PDU session to be used for communicating the media traffic for each media type of the plurality of media types comprises determining a network slice type for routing media traffic of the IMS session based on the media type of the IMS session using a route selection policy stored at the remote unit.

13. The method of claim 12, wherein the route selection policy comprises a mapping of at least one of:
a specific IMS communication service identifier ("ICSI"), or
a specific media type, to a specific single network slice selection assistance information ("S-NSSAI"), the specific S-NSSAI identifying a network slice of the mobile communication network.

14. The method of claim 10, wherein selecting the PDU session to be used for communicating the media traffic for each media type of the plurality of media types comprises determining a network slice type for routing media traffic of the IMS session based on at least one of:
an IMS communication service identifier ("ICSI"); or
an IMS application reference identifier ("IARI") of the IMS session.

15. The method of claim 10, wherein each PDU session specifies at least one of a data network name ("DNN"), a session and service continuity ("SSC") mode, and a network slice identifier, wherein selecting a PDU session to be used for communicating the media traffic for each media type of the plurality of media types comprises:
determining that a first media type from the plurality of media types cannot be transferred in the first of the plurality of PDU sessions;
determining, in response to the first media type not being transferrable over the first of the plurality of PDU sessions, that the first media type is transferrable over a second of the plurality of PDU sessions,
wherein the IMS session request message is a session initiation protocol ("SIP") INVITE request that comprises an indication that the first media type is to be communicated over the second of the plurality of PDU sessions.

16. The method of claim 15, wherein
a PDU session corresponding to the first of the plurality of PDU sessions has the IMS network as the DNN,
the first request is received from an application running on the remote unit, and
the SIP INVITE request comprises a session description protocol ("SDP") offer, the SDP offer comprising an indication of the first media type and an internet protocol ("IP") address of the second of the plurality of PDU sessions, each of the plurality of PDU sessions being allocated a different IP address.

17. The method of claim 10, wherein each PDU session specifying at least one of a data network name ("DNN") a session and service continuity ("SSC") mode, and a network slice identifier, wherein selecting the PDU session to be used for communicating the media traffic for each media type of the plurality of media types comprises:

determining that a first media type from the plurality of media types cannot be transferred in any of the plurality of PDU sessions;

transmitting, in response to the first media type not being transferrable in any of the plurality of PDU sessions, a second request to establish a new PDU session in the IMS session, the second request indicating a network slice type that is associated with the first media type, wherein the IMS session request message is a session initiation protocol ("SIP") INVITE request that comprises an indication that the first media type is to be communicated over the new PDU session.

18. The method of claim 17, wherein a PDU session corresponding to the first of the plurality of PDU sessions has the IMS network as the DNN, the first request is received from an application running on the remote unit, and the SIP INVITE request comprises a session description protocol ("SDP") offer, the SDP offer comprising an indication of the first media type and an internet protocol ("IP") address of the new PDU session, each of the plurality of PDU sessions being allocated a different IP address.

\* \* \* \* \*